United States Patent
Aretz et al.

(10) Patent No.: US 7,627,313 B2
(45) Date of Patent: Dec. 1, 2009

(54) METHOD, TELECOMMUNICATION SYSTEM AND TELECOMMUNICATION HANDSET FOR WIRELESS COMMUNICATION AND TELECOMMUNICATION IN A SMART HOME ENVIRONMENT

(75) Inventors: Kurt Aretz, Isselburg (DE); Rolf Biedermann, Ahaus (DE); Anton Kruk, Hamminkeln (DE); Volker Mösker, Isselburg (DE); Stefan Nieder, Isselburg (DE); Peter Schliwa, Hamminkeln (DE); Christoph Wedi, Bocholt (DE); Marco van de Logt, Goch (DE)

(73) Assignee: Gigaset Communications GmbH, Munich (DE)

( * ) Notice: Subject to any disclaimer, the term of this patent is extended or adjusted under 35 U.S.C. 154(b) by 771 days.

(21) Appl. No.: 10/563,382

(22) PCT Filed: Dec. 22, 2004

(86) PCT No.: PCT/EP2004/053674

§ 371 (c)(1),
(2), (4) Date: Jan. 5, 2006

(87) PCT Pub. No.: WO2005/062535

PCT Pub. Date: Jul. 7, 2005

(65) Prior Publication Data

US 2008/0220767 A1    Sep. 11, 2008

(30) Foreign Application Priority Data

Dec. 22, 2003    (DE)    ............... 103 60 532

(51) Int. Cl.
*H04Q 7/20*    (2006.01)
(52) U.S. Cl. ............... 455/426.1; 455/414.2; 340/541
(58) Field of Classification Search ............ None
See application file for complete search history.

(56) References Cited

U.S. PATENT DOCUMENTS

2001/0012338 A1    8/2001    Frank et al.
2003/0035523 A1    2/2003    Mansfield
2003/0192053 A1    10/2003    Sheppard et al.

*Primary Examiner*—Lester Kincaid
*Assistant Examiner*—Phuoc Doan
(74) *Attorney, Agent, or Firm*—Baker Botts L.L.P.

(57) ABSTRACT

In order to achieve simple, user-friendly "smart home" scenarios in a telecommunications system in the context of the transmission of textual, audio, video and/or control data between a data source and a data sink, a mobile element of the telecommunications system generates control commands and transmits the latter in a target manner in message traffic between the units that form part of the wireless communication or telecommunication process via the air interface. The mobile element is preferably configured as a cordless telephone handset or a mobile telephone. Textual, audio, video and/or control data that has been stored in the data source is detected, issued, released or externally transferred to a data sink or issued to a data source with the aid of the control commands.

40 Claims, 24 Drawing Sheets

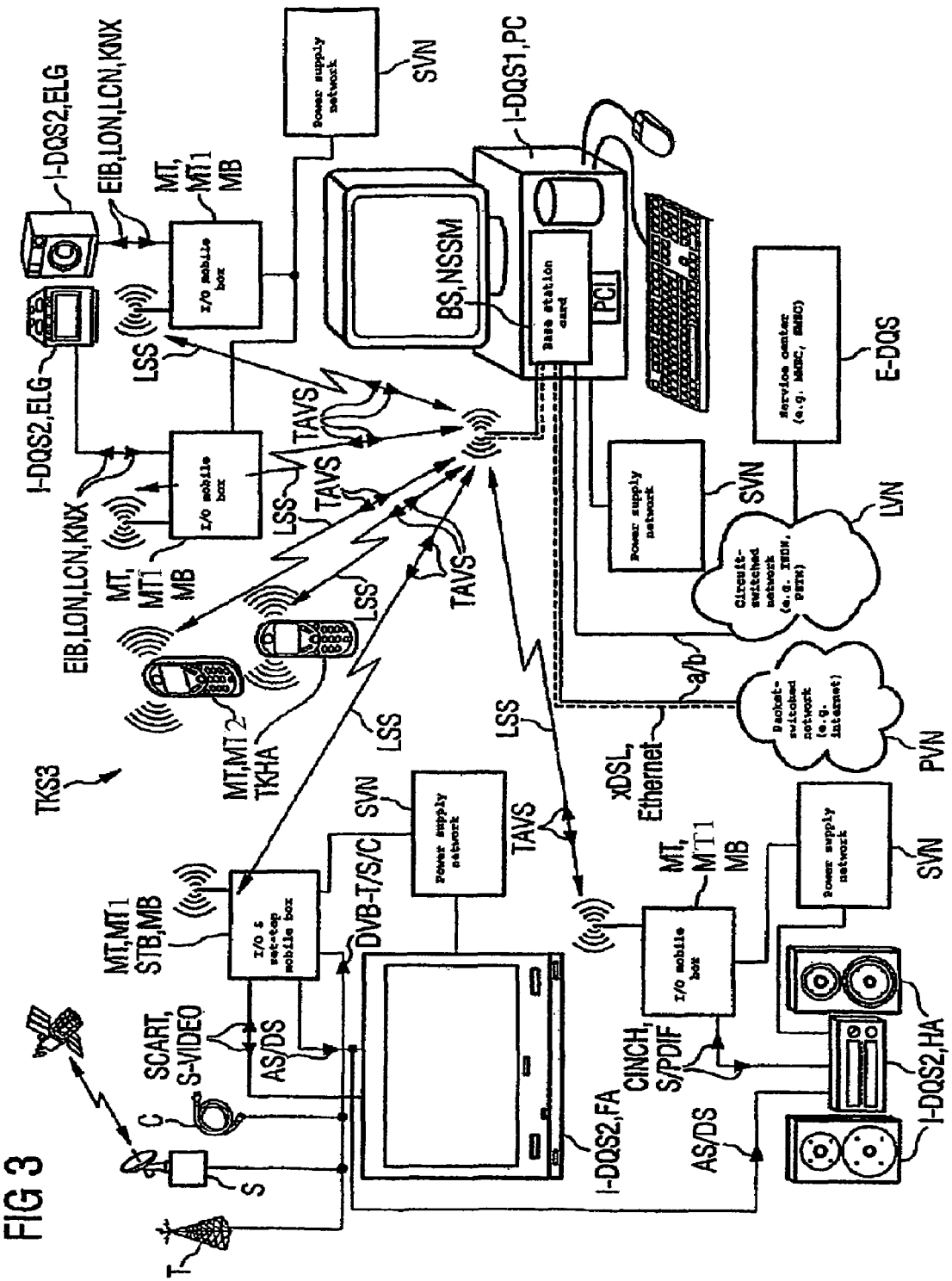

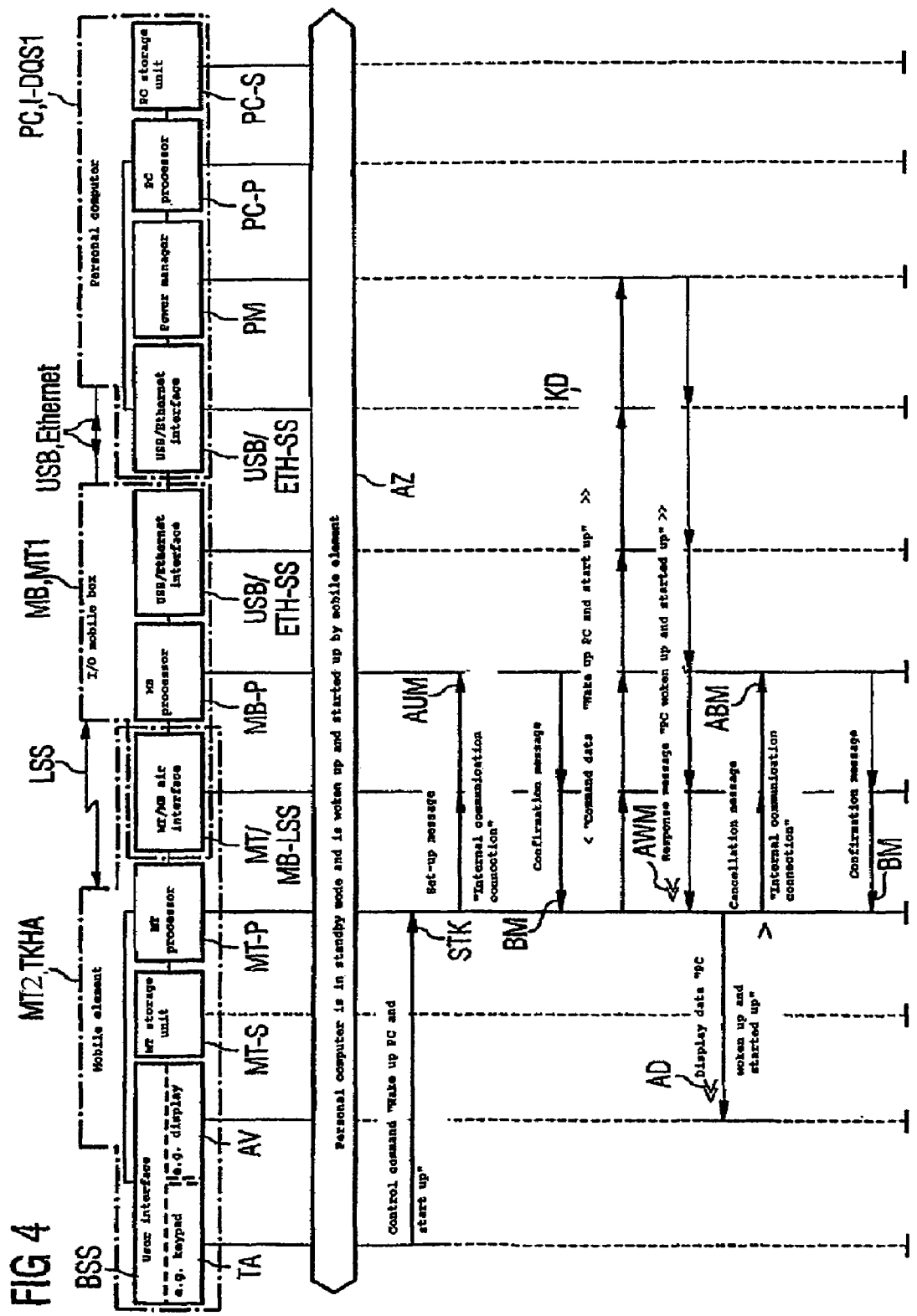

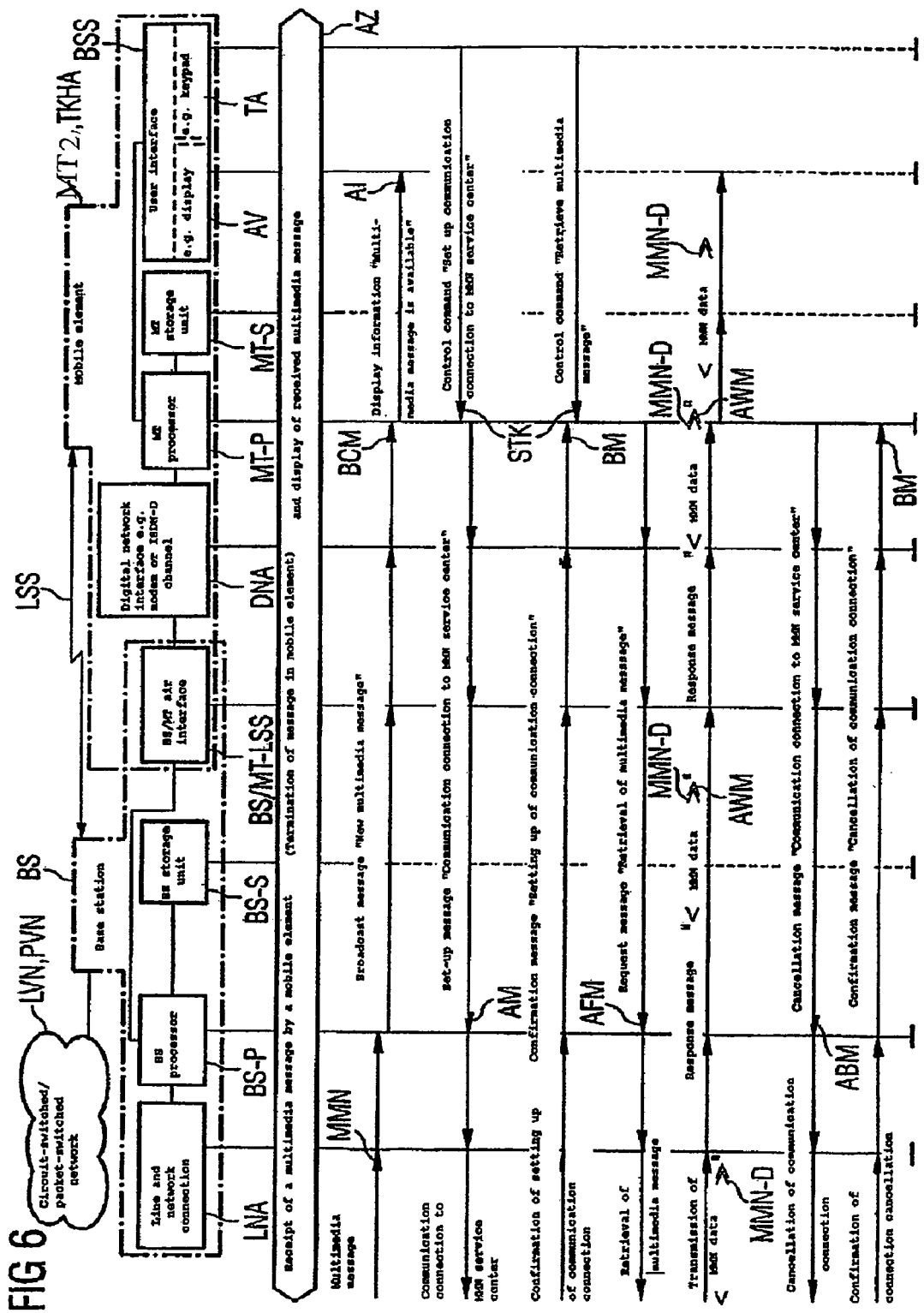

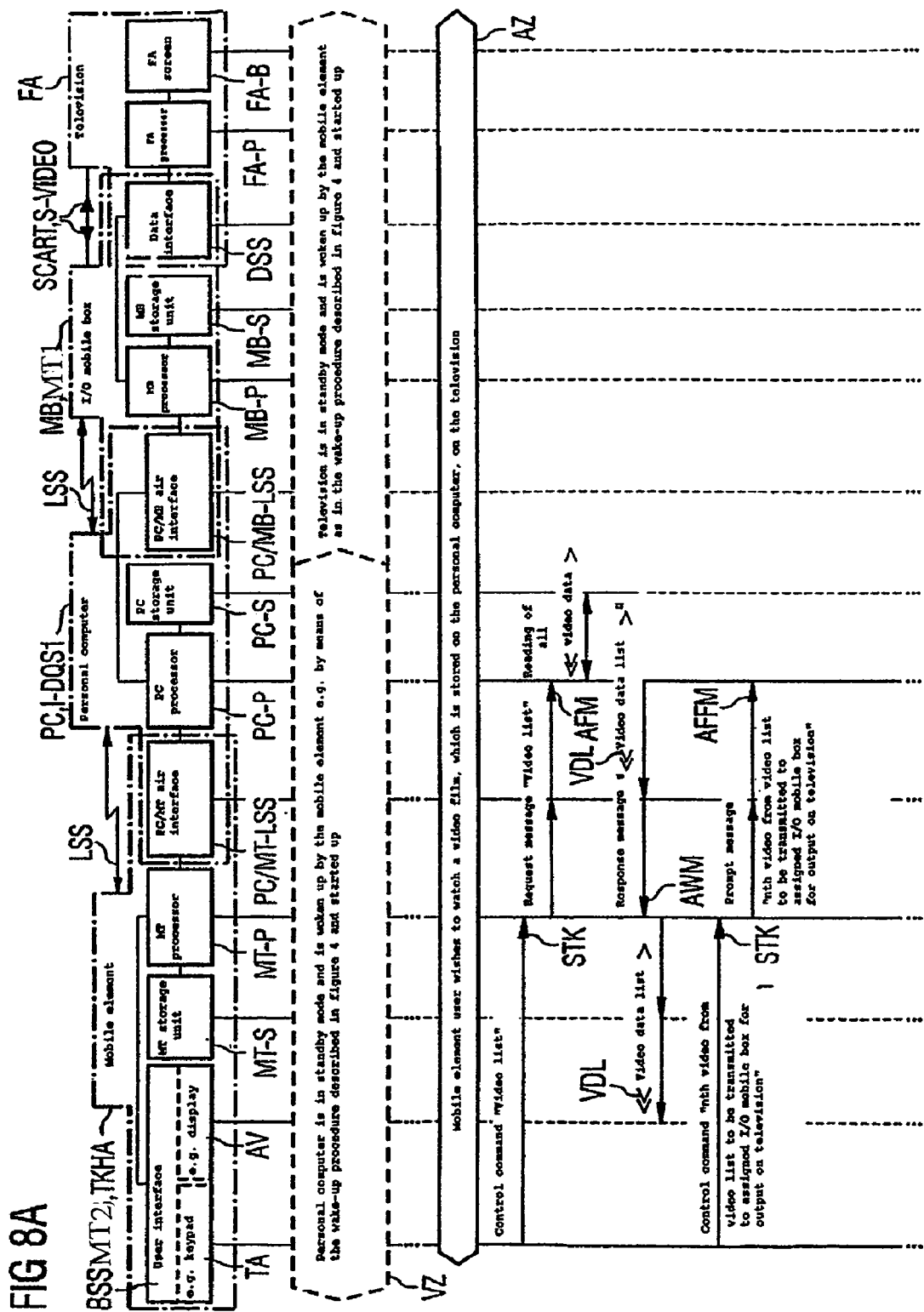

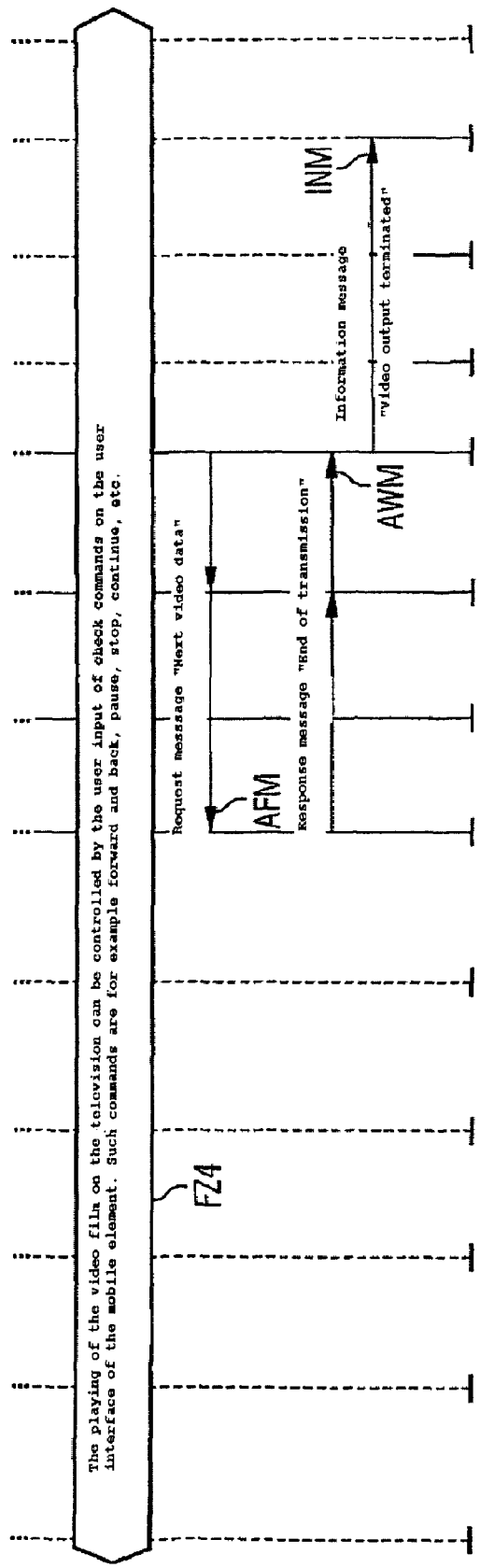

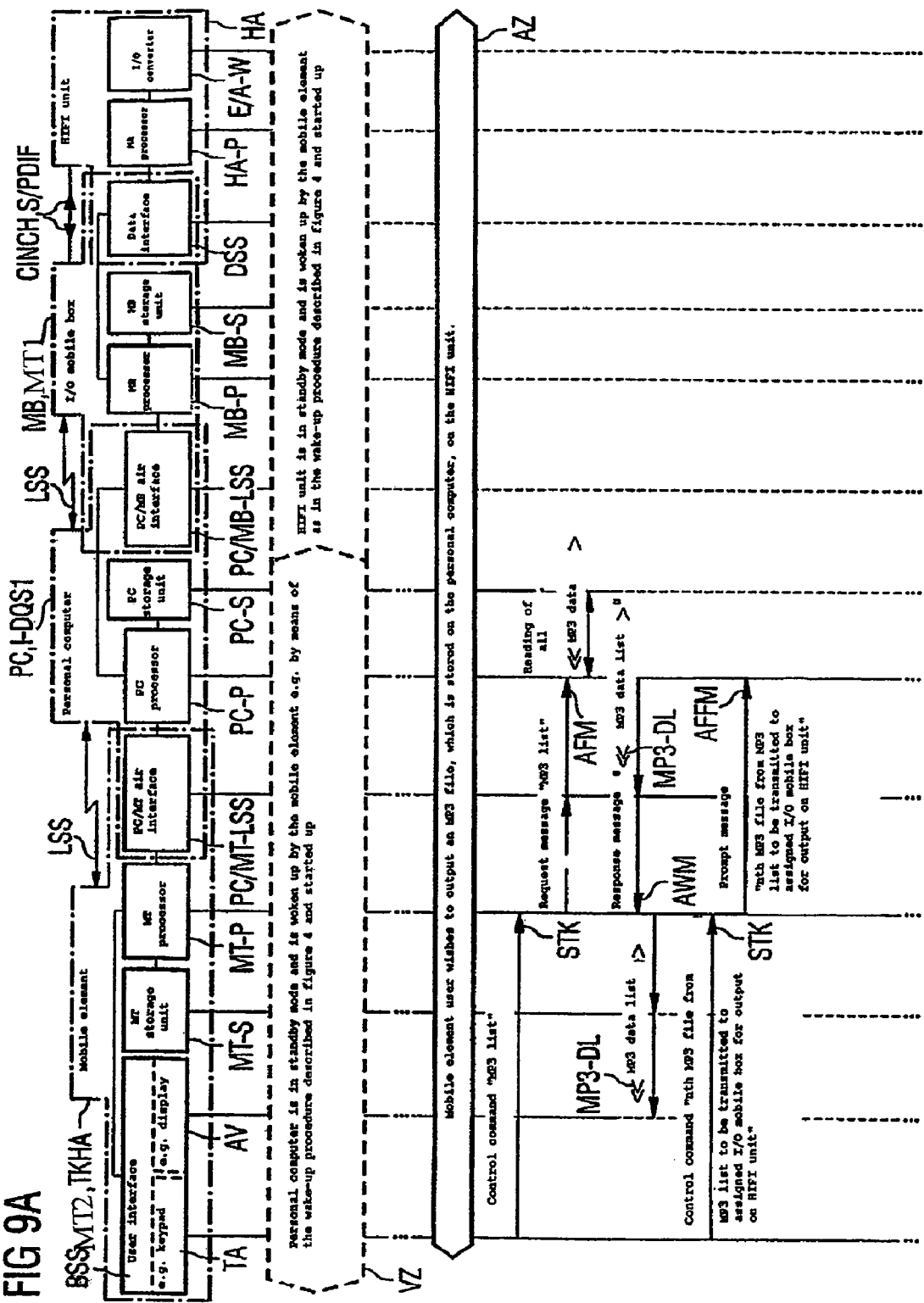

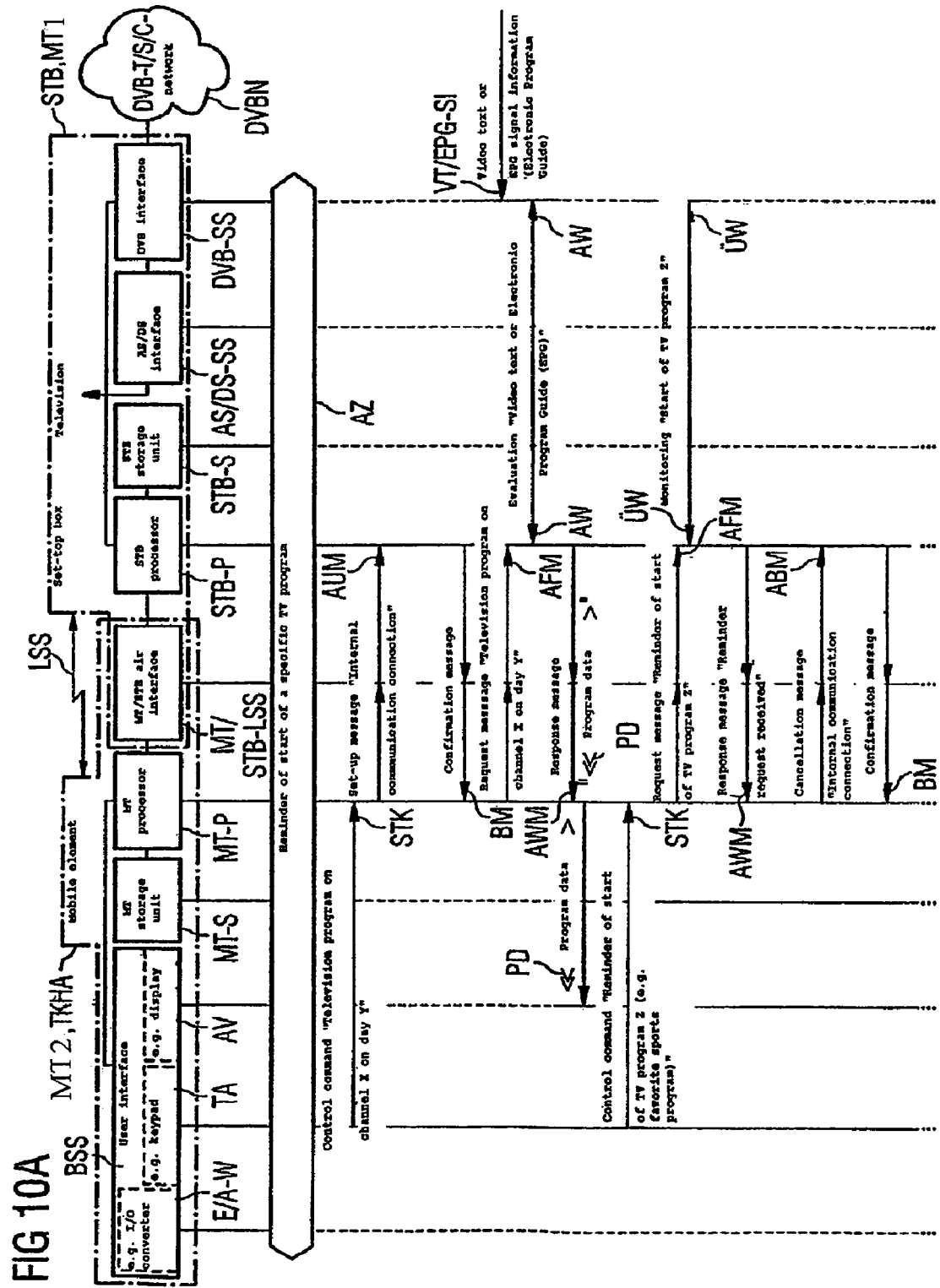

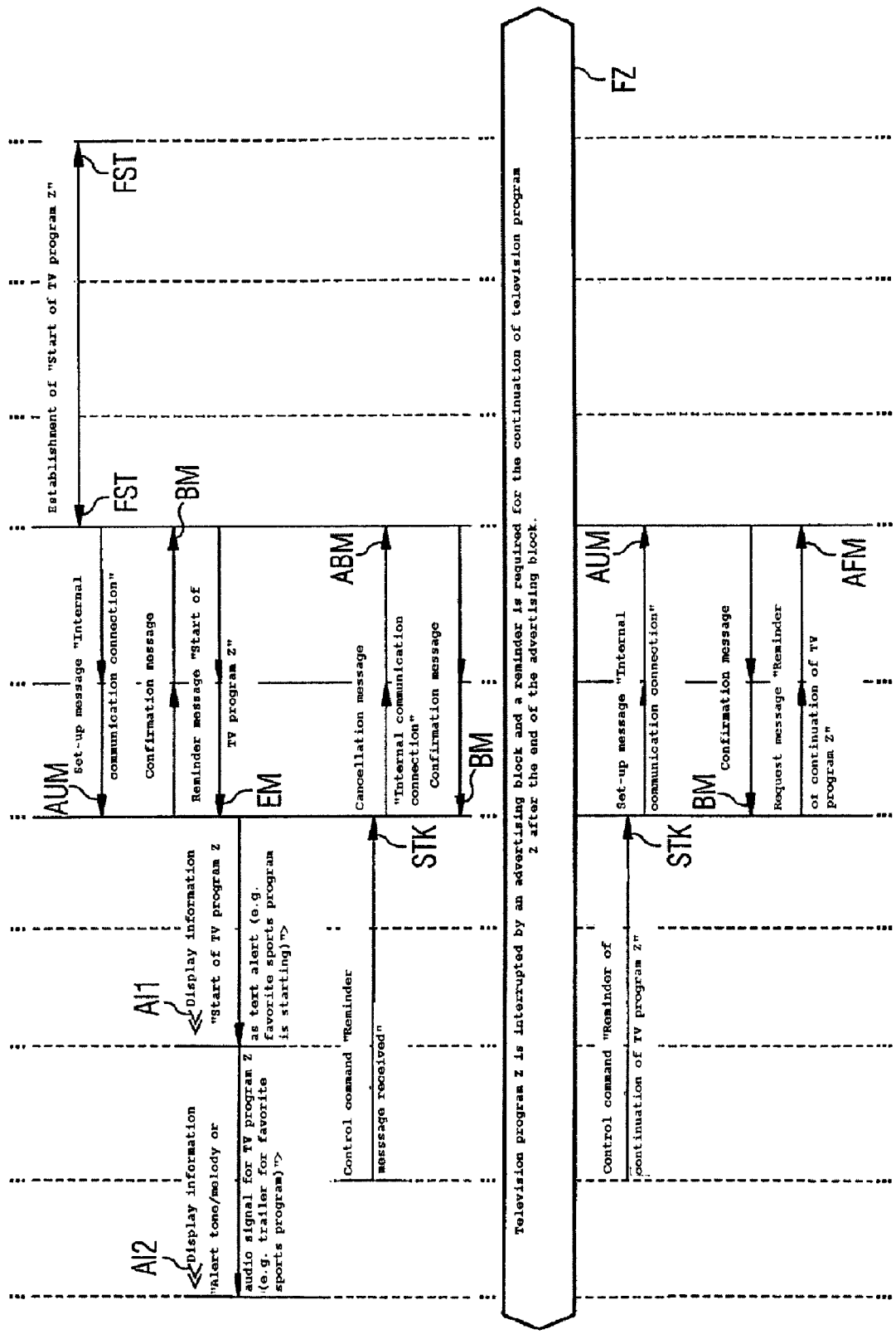

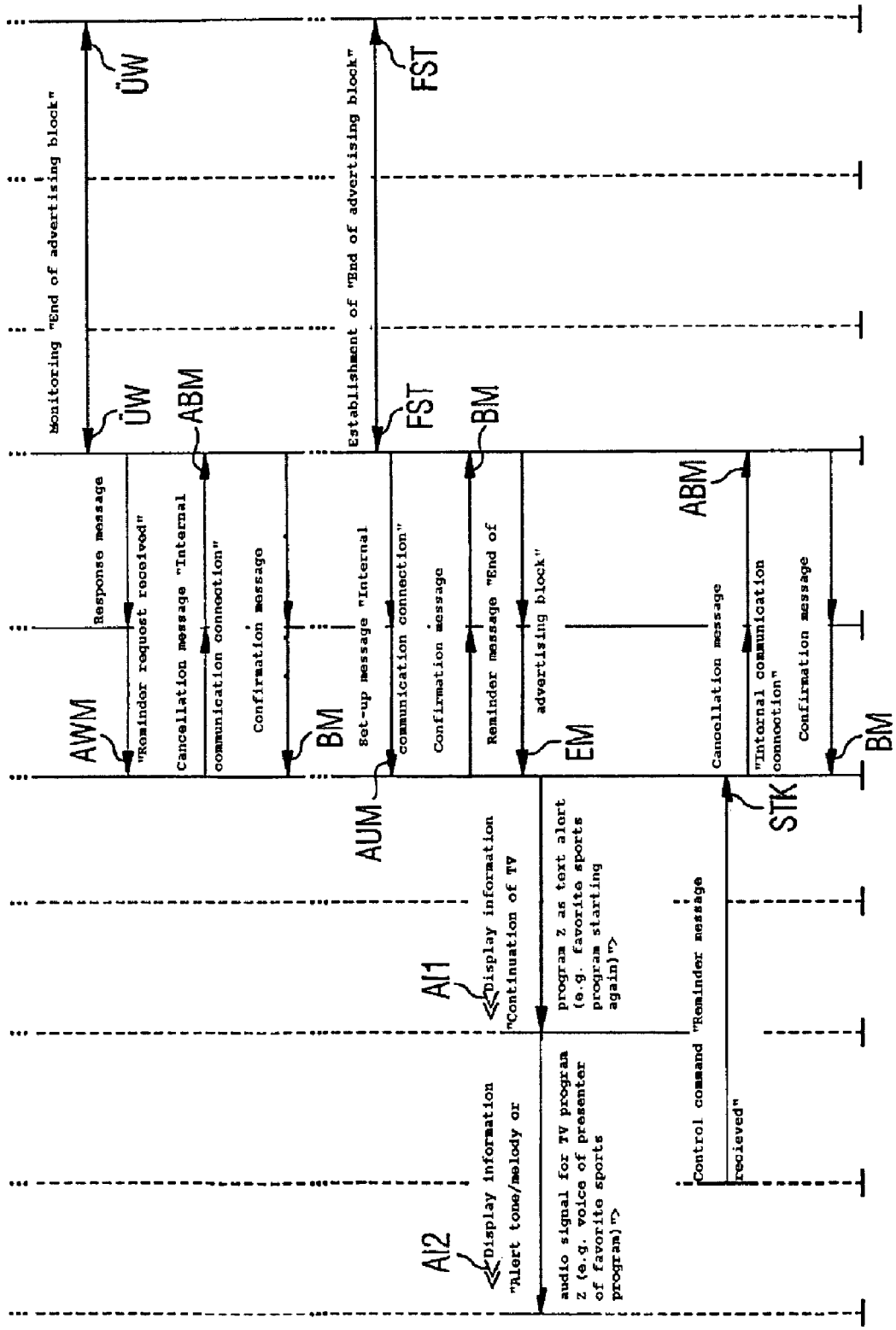

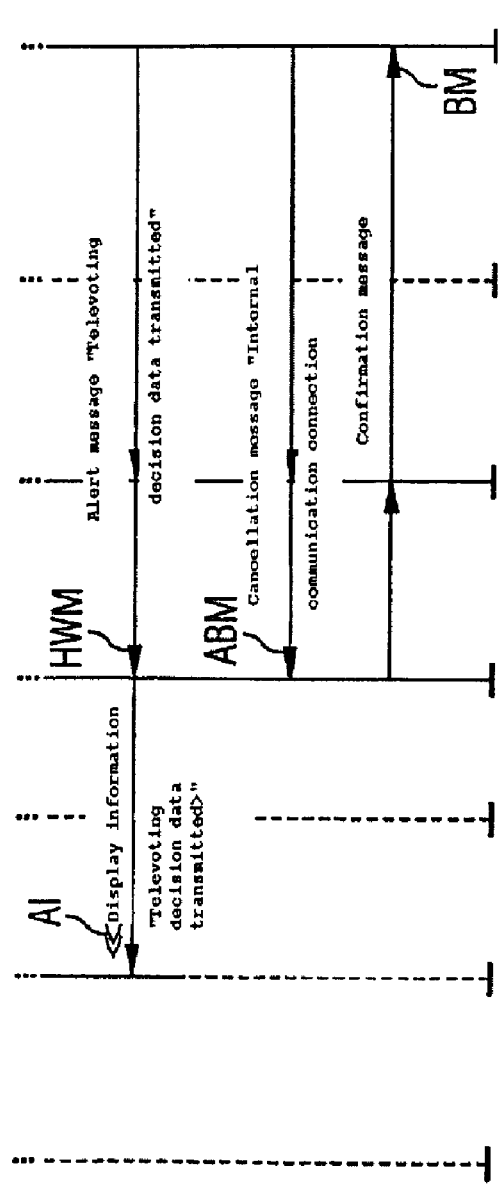

METHOD, TELECOMMUNICATION SYSTEM AND TELECOMMUNICATION HANDSET FOR WIRELESS COMMUNICATION AND TELECOMMUNICATION IN A SMART HOME ENVIRONMENT

TECHNICAL FIELD

The present disclosure is related to smart home networking and communicating over a network using mobile devices.

BACKGROUND

The term "smart home" refers to the total networking of electronic maintenance systems, communication technology and domestic technology including partial automation in a (family) home or a building (multiple occupancy residence, high-rise building, factory building, office building, residential block, etc.), in which all the devices and equipment in the residence/building are connected together via a local (internal) network and are also linked to a global (external) network and in which there is increasing integration of the specified networking technologies as a result of general technical convergence.

A key role in this networking principle in the domestic field is certainly played by wireless communication technology and in particular those technologies that offer simple, fast, user-friendly and not least of all economical solutions to the networking principle. Particular examples of these are all cordless technologies with which the smart home owner can set up their own local network, to have access to the global network, e.g. the internet, in a small radius of up to 300 meters, so-called hotspots, from any current location within said hotspots. Potential cordless technologies covering the specified short range field preferably include WLAN (Wireless Local Area Network) technology according to the IEEE standard 802.11 (a . . . ), DECT (Digital Enhanced Cordless Telecommunication) technology according to the ETSI standard ETS 300 175-1 . . . 7, Bluetooth technology according to the Bluetooth standard (BT spec. v1.2), WiMax technology according to the IEEE standard 802.16, ZigBee technology according to the IEEE standard 802.15.4 and/or mobile radio technologies in current use, such as the GSM or 3GPP radio system, in conjunction with one of the short-range radio standards mentioned.

Devices and equipment networked with the wireless communication technology form a telecommunication system in the intelligent home/building, which is able to manage a plurality of functions such as operation and control functions, security and monitoring functions, health and care functions, control functions, logistics functions as well as communication and maintenance functions.

In such an home/building networked intelligently by means of wireless communication technology, text, audio, video and/or control data is generally transmitted for this purpose between the devices and equipment that are part of the smart home scenario inside (communication) or outside (telecommunication) the networked home/building, thereby functioning as the data source and/or data sink.

BRIEF DESCRIPTION

Accordingly, a method, a telecommunication system and a telecommunication handset is disclosed for wireless communication and telecommunication in a smart home environment, in which text, audio, video and/or control data is generally transmitted between a data source and a data sink, can be implemented simply and quickly as well as in a user-friendly manner.

Under an exemplary embodiment, a mobile element of a telecommunication system for wireless communication and telecommunication in a smart home environment. Preferably, the mobile element is configured as a cordless telephone handset or as a mobile telephone, communicating in a network including a base station connected to a circuit-switched and/or packet-switched network for conducting telephone calls and sending/receiving text, audio, video and/or control data and at least one mobile element for conducting telephone calls and/or sending/receiving text, audio, video and/or control data, connected together via an air interface. The mobile element generates control commands and transmits these in a targeted manner in the course of message traffic between the equipment involved in the wireless communication or telecommunication, e.g. embedded in HF or radio signals, via the air interface. The control commands are used, among other things, to detect text, audio, video and/or control data stored in a data source and to prompt and effect the output, release or transfer out of said data to a data sink or its output at the data source.

On the premise that the mobile element and the equipment mentioned can themselves be both data source and data sink, the following exemplary scenario results according to which the control commands can be used:

(i) to detect or access text, audio, video and/or control data terminated in the base station and/or in the mobile element and to transmit this data from the equipment, in which the data terminated, to an INTERNAL data source/data sink with a first mobile element assigned to it and/or an EXTERNAL data source/data sink connected to the base station and assigned to the circuit-switched and/or packet-switched network to output, release or transfer out said data directly—i.e. without the intermediate connection of a further mobile element, the base station and/or other equipment—or indirectly—i.e. for example with the intermediate connection of a further mobile element, the base station and/or other equipment; and (ii) to detect or access text, audio, video and/or control data terminated in the mobile element and/or the INTERNAL data source/data sink and to transmit this data from the equipment, in which the data terminated, via the first mobile element assigned to the INTERNAL data source/data sink and/or the base station to the mobile element, the EXTERNAL data source/data sink, and/or the INTERNAL data source/data sink to output, release or transfer out said data directly. i.e. for example without the intermediate connection of a further mobile element, the base station and/or other equipment—or indirectly—i.e. for example with the intermediate connection of a further mobile element, the base station and/or other equipment.

Under the embodiment, the mobile element generating and transmitting the control commands is preferably a cordless telephone handset or mobile telephone with a user-friendly operator interface (e.g. keypad, display, menu control, voice control, etc.) with an additional control functionality designed for the above-mentioned purpose. The cordless telephone handset/mobile telephone with this additional functionality can therefore be used as a mobile communication instrument as well as a universal controller or remote control instrument in the smart home environment, thereby improving the user-friendliness of the cordless telephone handset or mobile telephone for the user or operator. The user or operator only requires a single device for the various smart home scenarios, e.g. telephony, intelligent control of devices and equipment in the residential domain (e.g. SOHO: Small Office/HOme), and not a number of devices as with the prior art.

In both cases, the cordless telephone handset and the mobile telephone, the base station is a preferably cordless base station. The mobile telephone interfaces with this cordless base station via a cordless interface, e.g. a Bluetooth interface.

Additional advantageous developments of the invention are set out in other exemplary embodiments. These include in particular:

A configuration where the control functionality of the mobile element can be extended beyond the control commands to check commands which improve user-friendliness with regard to outputting, releasing or transferring out text, audio, video and/or control data. Typical check commands relating to displaying/outputting data are for example the "Forward and back", "Terminate", "Interrupt/Pause", "Stop", "Continue", etc. commands and those relating to the release and transfer out are the "Abort", "Delete", "Copy", etc. commands.

To tailor the physical resources for wireless communication and telecommunication in the smart home environment optimally to the data to be transmitted (e.g. voice data and packet data) and the quantity of data generally associated therewith, it is advantageous in some instances to provide different separate air interfaces for the two types of data mentioned. For example, one air interface may be provided for broadband transmission (e.g. Bluetooth interface, IEEE 802.11 a/b/g-based interfaces, etc.) and one air interface may be provided for telephony (e.g. DECT, VVDCT, GSM interface, etc.). For reasons of compatibility, interoperability, and susceptibility to interference, it is sometimes necessary to handle wireless communication and telecommunication in a smart home environment via just one air interface, preferably an air interface that is suitable for broadband transmission (e.g. an interface based on the standard IEEE 802.11 a/b/g). However other cordless interfaces can also be considered, e.g. an interface based on WiMax and/or ZigBee technology.

BRIEF DESCRIPTION OF DRAWINGS

The various objects, advantages and novel features of the present disclosure will be more readily apprehended from the following Detailed Description when read in conjunction with the enclosed drawings, in which:

FIG. 3 illustrates a third telecommunication system for wireless communication and telecommunication in a smart home environment;

FIG. 4 illustrates a first message sequence chart, wherein the user of a mobile element of the telecommunication systems shown in FIGS. 1 to 3 uses the mobile element to wake up a personal computer from standby mode and start it up (first smart home scenario);

FIG. 6 illustrates a third message sequence chart, according to which the user of a mobile element of the telecommunication systems shown in FIGS. 1 to 3 uses the mobile element to receive a multimedia message, and to terminate it in the mobile element, and to display it (third smart home scenario);

FIGS. 8a to 8d illustrate a fifth message sequence chart, according to which the user of a mobile element of the telecommunication systems shown in FIGS. 1 to 3 watches a video film that is stored on a personal computer on a television (fifth smart home scenario);

FIGS. 9a to 9d illustrate a sixth message sequence chart, according to which the user of a mobile element of the telecommunication systems shown in FIGS. 1 to 3 outputs an MP3 file that is stored on a personal computer to a HIFI unit (sixth smart home scenario);

FIGS. 10a to 10c illustrate a seventh message sequence chart, according to which the user of a mobile element of the telecommunication systems shown in FIGS. 1 to 3 is informed by the mobile element of the start of a television program and its interruption by advertisement blocks (seventh smart home scenario); and FIGS. 11a to 11c illustrate an eighth message sequence chart, according to which the user of a mobile element of the telecommunication systems shown in FIGS. 1 to 3 takes part in televoting with the aid of the mobile element (eighth smart home scenario).

DETAILED DESCRIPTION

Figure 1:
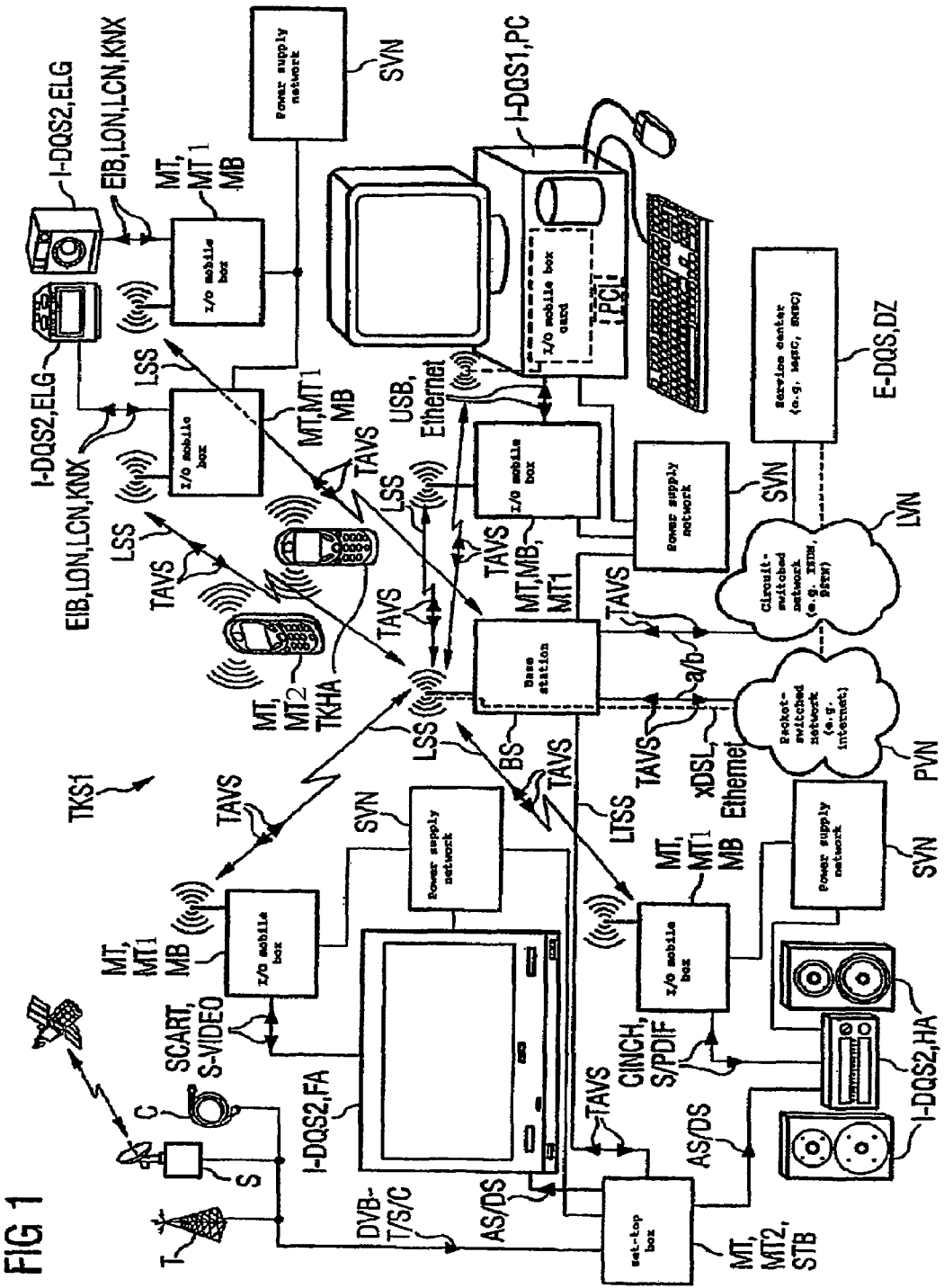
FIG. 1 illustrates a first telecommunication system for wireless communication and telecommunication in a smart home environment.

FIG. 1 shows a first telecommunication system TKS1 for wireless communication and telecommunication in a smart home environment. The first telecommunication system TKS1 has a base station BS preferably configured as a cordless base station, which is connected via a circuit connection a/b to a circuit-switched network PVN, which can for example be configured as an ISDN or PSTN network, and with an additional xDSL or ETHERNET connection to a packet-switched network PVN, which can for example be configured as the Internet. Telecommunication system TKS1 also includes at least one mobile element MT, configured as a cordless mobile element and a corded mobile element, which is connected bi-directionally to the base station BS via an air interface LSS or via a line interface LTSS respectively for EXTERNAL communication to provide access to the circuit-switched network LVN and/or the packet-switched network PVN and/or for INTERNAL communication between the mobile elements in the telecommunication system.

EXTERNAL communication includes short messages being transmitted according to the Short Message Service SMS and/or multimedia messages being transmitted according to the Multimedia Message Service MMS between the base station BS and/or the mobile elements MT and a service center DZ. As such, a subscriber in the first telecommunication system TKS1 may send such a message to a remote telecommunication subscriber or the telecommunication subscriber may receive such a message from the remote telecommunication subscriber.

With INTERNAL communication, the mobile elements generally communicate via the base station BS, with the base station assuming control of the communication (connection) and simply forwarding the data to be transmitted for the actual useful data transmission. It is however also possible for the mobile elements, which are connected via the air interface LSS to the base station BS, to transmit the data mutually without involving the base station BS in the course of a so-called point to point connection, where they are responsible both for controlling the connection and for the actual useful data transmission.

The cordless mobile elements MT of the first telecommunication system TKS1, which are connected via the air interface LSS to the cordless base station BS, are either cordless INPUT/OUTPUT mobile boxes MB, so-called cordless I/O mobile boxes, or telecommunication handsets TKHA configured as cordless user-friendly telephone handsets with a user interface (operator interface) comprising a keypad or voice control as well as a display device with menu control, while the corded mobile element MT, which is connected via the line interface LTSS to the base station BS, is illustrated as a corded set-top box STB.

As an alternative to the first telecommunication system TKS1 shown in FIG. 1, the telecommunication system can be modified such that, instead of the cordless user-friendly telephone handset, a mobile telephone with the same or comparable features (e.g. a GSM or 3GPP mobile) is used with a cordless interface for cordless connection to the cordless base station BS and to the other cordless mobile elements MT.

In a further modification it is also possible for the cordless base station BS also to be replaced by a mobile radio base station. This means that INTERNAL communication is such a telecommunication system is exclusively wireless communication from cordless mobile element to cordless mobile element or from cordless mobile telephone to the mobile telephone with the cordless interface in the course of a point to point connection, without involving the mobile radio base station. EXTERNAL communication in this telecommunication system from the mobile telephone to the external network takes place, as in mobile radio, via the mobile radio base station, while EXTERNAL communication from the other cordless mobile elements MT takes place both via the mobile telephone and the mobile radio base station, with the mobile telephone thereby operating as a cordless/mobile radio converter.

The different I/O mobile boxes MB and the set-top box in the first telecommunication system TKS1 are connected to various devices and equipment for the smart home scenario. Thus an I/O mobile box MB, configured as a first mobile element MT1, is connected via a circuit connection USB, ETHERNET to a personal computer PC. Instead of connecting the personal computer PC via the circuit connection USB, ETHERNET to the first mobile element MT1 or the I/O mobile box MB, an integration solution is also possible, in which an I/O mobile box card MBK configured as a first mobile element MT1 with a PCI (Peripheral Component Interconnect) bus interface is housed on a free PCI card slot of the personal computer PC.

Multiple (such as four) I/O mobile boxes MB are also connected as further first mobile elements MT1 to a television FA, a HIFI unit HA and two electrical appliances ELG, a washing machine and an electric cooker. While the connection between the television FA and the first mobile element MT1 is preferably a circuit connection SCART S-VIDEO (Syndicat des Constructeurs d'Appareils Radiorécepteurs et Téléviseurs; Super-Video) and the connection between the HIFI unit HA and the first mobile element MT1 is preferably a circuit connection CINCH, S/PDIF (standard connection originating from the CINCH company for transmitting electrical signals, used on coaxial cables; Sony/Philips Digital InterFace), the connection between the two electrical appliances ELG, the washing machine and the electric cooker, are preferably a circuit connection EIB, LON, LCN, KNX (European Installation Bus—a standard bus for building installations to control all types of technical device; Local Operating Network—a field bus system by the US company Echolon; Local Control Network—a bus system from the Issendorf company; KoNeX standard), in which the power of the three bus systems EIB, BatiBus and EHS is combined, thereby guaranteeing interoperability, where BatiBus is a bus system developed in France, similar in structure to the EIB bus and where EHS is an association of a number of European companies to produce the European Home System. All the circuit connections specified SCART, S-VIDEO, CINCH, S/PDIF, EIB, LON, LCN KNX are standard interfaces used in domestic technology and electronic maintenance systems.

It should be pointed out here that the integration solution discussed with the I/O mobile box <- - - -> personal computer assignment is of course also possible with the television FA, the HIFI unit HA and the electrical appliances ELG.

The electrical appliances ELG, the television FA, the HIFI unit HA, the personal computer PC, the base station BS and the I/O mobile boxes MB configured as the first mobile element MT1 are all connected to a power supply network for power supply purposes.

In contrast to this, the telecommunication handsets TKHA, configured as second mobile elements MT2 and also connected to the base station BS via the air interface LSS, are battery operated, while the set-top box STB belonging to the first mobile elements MT1 and connected to the base station BS via line interface LTSS and is connected to the power supply network SVN like the I/O mobile boxes MB. The set-top box STB receives a DVB-signal DVB-T/S/C (Digital Video Broadcasting—Terrestrial/Satellite/Cable) and converts said DVB signal to an Analog Signal/Digital Signal AS/DS for the television FA and the HIFI unit HA.

In the first telecommunication system TKS1, video and/or control data TAVS is now transmitted during "smart home" scenarios between the mobile elements MT1, MT2 and the base station BS, between the mobile elements MT1, MT2 and between the mobile elements MT1, MT2 and the base station BS, as well as the circuit-switched network LVN and the packet-switched network PVN, including the service center DZ assigned to these networks. Because, the data can be transmitted from any device or any equipment in the first telecommunication system TKS1 to another device or other equipment in the telecommunication system TKS1 and these devices or equipment operate as data source/data sink, such as the personal computer PC, the television FA, the HIFI unit HA and the electrical appliances ELG as well as the service center DZ, the personal computer PC is referred to as the first INTERNAL data source/data sink I-DQS1 because of its locational local proximity to the base station BS and its assignment to the first mobile element MT1. The television FA, HIFI unit HA and electrical appliances ELG are referred to as the second INTERNAL data source/data sink I/DQS2 also due to their locational local proximity to the base station BS and their assignment to the first mobile element MT1. The service center DZ is referred to as the EXTERNAL data source/data sink E-DQS due to its association with the circuit-switched network LVN and the packet-switched network PVN and therefore its locational local remoteness from the base station BS.

It is understood that the mobile elements MT1, MT2 and the base station BS can be configured as further data sources/data sinks.

The text, audio, video and/or control data TAVS transmitted in the first telecommunication system TKS1 for the smart home scenario can be supplied as follows:

The text data is preferably short messages according to the Short Message Service or video text information.

The audio data is preferably telephone call information, music information according to the Multimedia Message Service or audio downloads from the internet, e.g. MP3 files.

The video data is preferably image information according to the Multimedia Message Service or video downloads from the internet.

The control data finally is data for controlling, measuring, regulating, calibrating, diagnosing and/or maintaining electrical appliances.

To tailor the physical resources of the first telecommunication system TKS1 for wireless communication and telecommunication in the smart home environment optimally to the data to be transmitted (e.g. voice and text data on the one hand and packet, audio and video data on the other hand) and the quantity of data generally associated therewith, the first telecommunication system TKS1 is preferably designed such that different air interfaces that are optimally designed for the respective data transmission are available for the different types of data mentioned. The air interface LSS can therefore include a shared interface for telephony and broadband data transmission or a separate interface for telephony and broadband data transmission respectively.

The air interface LSS may be an interface based on DECT, WDCT, DECT and Bluetooth, VWDCT and Bluetooth, DECT and IEEE 802.11 a, DECT and IEEE 802.11b, DECT and IEEE 802.11g, WDCT and IEEE 802.11 a, WDCT and IEEE 802.11b, WDCT and IEEE 802.11 g, GSM and DECT, GSM and Bluetooth, GSM and IEEE 802.11a, GSM and IEEE 802.11b, GSM and IEEE 802.11 g, 3GPPP and Bluetooth, 3GPP and IEEE 802.11a, 3GPP and IEEE 802.11b or 3GPP and IEEE 802.11 g, or any similar standard that is known in the art.

Figure 2:
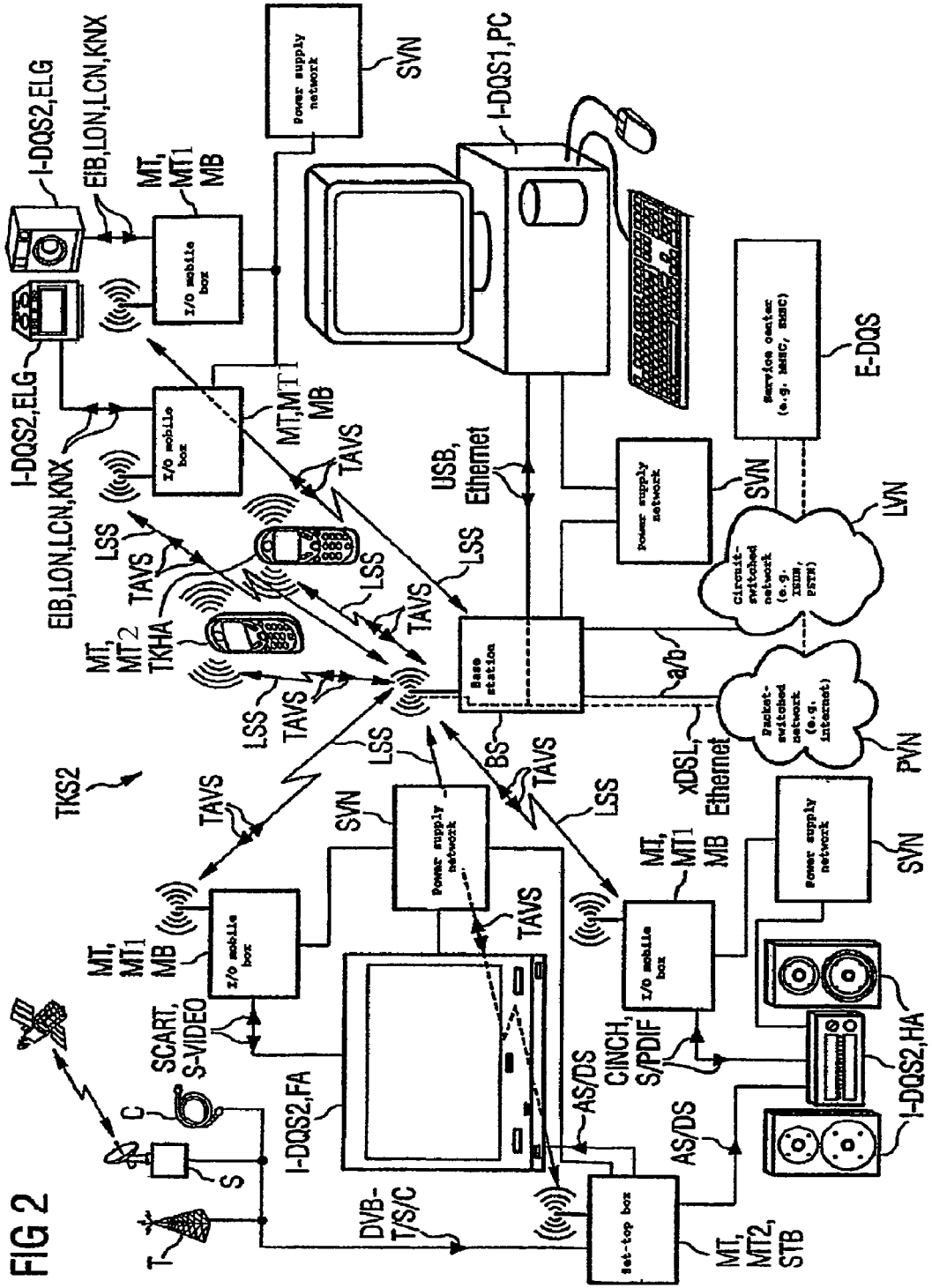
FIG. 2 illustrates a second telecommunication system for wireless communication and telecommunication in a smart home environment.

FIG. 2 shows a second telecommunication system TKS2 for wireless communication and telecommunication in a smart home environment. The second telecommunication system TKS2, like the first telecommunication system TKS1 in FIG. 1, again has a base station BS preferably configured as a cordless base station, connected via a circuit connection alb to a circuit-switched network PVN, which can for example be configured as an ISDN or PSTN network, and with an additional xDSL or ETHERNET connection to a packet-switched network PVN. System TKS2 is further connected to at least one mobile element MT configured as a cordless mobile element, which is connected bi-directionally to the base station via an air interface LSS in each instance for EXTERNAL communication—access to the circuit-switched network LVN and/or the packet-switched network PVN—and/or for INTERNAL communication—communication between the mobile elements in the telecommunication system.

EXTERNAL communication can again be short messages being transmitted according to the Short Message Service SMS and/or multimedia messages being transmitted according to the Multimedia Message Service MMS between the base station BS and/or the mobile elements MT and a service center DZ. Accordingly, a subscriber in the first telecommunication system TKS1 may send such a message to a remote telecommunication subscriber, or the telecommunication system subscriber may receive such a message from the remote telecommunication subscriber.

With INTERNAL communication, the mobile elements involved generally communicate via the base station BS, with the base station assuming control of the communication (connection) and simply forwarding the data to be transmitted for the actual useful data transmission. It is however also possible for the mobile elements, which are connected via the air interface LSS to the base station BS, to transmit the data mutually without involving the base station BS in the course of a so-called point to point connection, where they are responsible both for controlling the connection and for the actual useful data transmission.

The cordless mobile elements MT of the second telecommunication system TKS2, which are connected via the air interface LSS to the cordless base station BS, are again either cordless INPUT/OUTPUT mobile boxes MB, so-called cordless I/O mobile boxes, a cordless set-top box STB with known functionality or telecommunication handsets TKHA configured as cordless user-friendly telephone handsets with a user interface (operator interface) comprising a keypad or voice control as well as a display device with menu control.

As an alternative to the second telecommunication system TKS2 shown in FIG. 2, a telecommunication system can be modified such that, instead of the cordless user-friendly telephone handset, a mobile telephone with the same or comparable features (e.g. a GSM or 3GPP mobile) is used with a cordless interface for cordless connection to the cordless base station BS and to the other cordless mobile elements MT.

The different I/O mobile boxes MB and the set-top box STB in the second telecommunication system TKS2 are again connected to various devices and equipment for the smart home scenario. In contrast to the first telecommunication system TKS1 however, a personal computer PC is now connected via a circuit connection USB, ETHERNET not to an I/O mobile box MB configured as a first mobile element MT1 but directly to the cordless base station BS.

Multiple (here four) I/O mobile boxes MB are also connected as further first mobile elements MT1 to a television FA, a HIFI unit HA and two electrical appliances ELG, a washing machine and an electric cooker. While the connection between the television FA and the first mobile element MT1 is again preferably a circuit connection SCART, S-VIDEO and the connection between the HIFI unit HA and the first mobile element MT1 is again preferably a circuit connection CINCH, S/PDIF, the connection between the two electrical appliances ELG, the washing machine and electric cooker, is again preferably a circuit connection EIB, LON, LCN, KNX.

It should be pointed out here that the direct connection option discussed with the base station < - - - > personal computer assignment is of course also possible with the television FA, the HIFI unit HA and the electrical appliances ELG.

The electrical appliances ELG, the television FA, the HIFI unit HA, the personal computer PC, the base station BS and the I/O mobile boxes MB, configured as the second mobile element MT2, are again all connected to a power supply network SVN for power supply purposes.

Telecommunication handsets TKHA, are configured as second mobile elements MT2 and are also connected to the base station BS via the air interface LSS, and are again battery operated, while the set-top box STB belonging to the first mobile elements MT1 and connected to the base station BS via the air interface LSS is connected to the power supply network SVN like the I/O mobile boxes MB. The set-top box STB again receives a DVB signal DVB-T/S/C and converts said DVB signal to an Analog Signal/Digital Signal AS/DS for the television FA and the HIFI unit HA.

In the second telecommunication system TKS2, as in the first telecommunication system TKS1, audio, video and/or control data TAVS is transmitted between the mobile elements MT1 and the base station BS, between the mobile elements MT1, MT2 and between the mobile elements MT1, MT2 and the base station BS on the one hand and the circuit-switched network LVN and the packet-switched network PVN including the service center DZ assigned to these networks on the other hand. As the data can again be transmitted from any device or any equipment in the second telecommunication system TKS2 to another device or other equipment in the telecommunication system TKS2, and these devices or equipment therefore operate as data source/data sink, such as the personal computer PC, the television FA, the HIFI unit HA and the electrical appliances ELG as well as the service center DZ. The personal computer PC is again referred to as the first INTERNAL data source/data sink I-DQS1 because of its locational proximity to the base station BS. The television FA, HIFI unit HA and electrical appliances ELG are again referred to as the second INTERNAL data source/data sink I/DQS2 also due to their locational proximity to the base station BS and their assignment to the first mobile element MT1. The service center DZ is again referred to as the EXTERNAL data source/data sink E-DQS due to its association with the circuit-switched network LVN and the packet-switched network PVN and therefore its locational local remoteness from the base station BS.

For the smart home scenario it is again possible that the mobile elements MT1, MT2 and the base station BS may also be configured as further data sources/data sinks.

The text, audio, video and/or control data TAVS transmitted in the second telecommunication system TKS2 for the smart home scenario can again be supplied as follows:

The text data is preferably short messages according to the Short Message Service or video text information.

The audio data is preferably telephone call information, music information according to the Multimedia Message Service or audio downloads from the internet, e.g. MP3 files.

The video data is preferably image information according to the Multimedia Message Service or video downloads from the internet.

The control data finally is data for controlling, measuring, regulating, calibrating, diagnosing and/or maintaining electrical appliances.

To tailor the physical resources of the second telecommunication system TKS2 for wireless communication and telecommunication in the smart home environment optimally again to the data to be transmitted (e.g. voice and text data on the one hand and packet, audio and video data on the other hand) and the quantity of data generally associated therewith, the second telecommunication system TKS2 is again preferably designed such that different air interfaces that are optimally designed for the respective data transmission are available for the different types of data mentioned. The air interface LSS can for example therefore again include a shared interface for telephony and broadband data transmission or again a separate interface for telephony and broadband data transmission respectively.

The air interface LSS may be based on DECT, WDCT, DECT and Bluetooth, WDCT and Bluetooth, DECT and IEEE 802.11a, DECT and IEEE 802.11b, DECT and IEEE 802.11g, WDCT and IEEE 802.11a, WDCT and IEEE 802.11b, WDCT and IEEE 802.11 g, GSM and DECT, GSM and Bluetooth, GSM and IEEE 802.11a, GSM and IEEE 802.11b, GSM and IEEE 802.11g, 3GPPP and Bluetooth, 3GPP and IEEE 802.11 a, 3GPP and IEEE 802.11b or 3GPP and IEEE 802.11 g, and any similar standard that is known in the art.

FIG. 3 shows a third telecommunication system TKS3 for wireless communication and telecommunication in a smart home environment. For this the third telecommunication system TKS3 has a base station BS preferably configured as a network interface module NSSM in the form of a cordless base station card integrated in a personal computer PC. The base station BS is connected via a circuit connection a/b to a circuit-switched network PVN, which may be configured as an ISDN or PSTN network, and with an additional xDSL or ETHERNET connection to a packet-switched network PVN. System TKS3 is further connected to at least one mobile element MT configured as a cordless mobile element and a corded mobile element, which is connected bi-directionally to the base station via an air interface LSS in each instance for EXTERNAL communication—access to the circuit-switched network LVN and/or the packet-switched network PVN—and/or for INTERNAL communication—communication between the mobile elements in the telecommunication system. The network interface module NSSM or base station card preferably has a PCI (Peripheral Component Interconnect) bus interface and is housed for this purpose on a free PCI card slot of the personal computer PC.

EXTERNAL communication can again involve short messages being transmitted according to the Short Message Service SMS and/or multimedia messages being transmitted according to the Multimedia Message Service MMS between the base station BS and/or the mobile elements MT and a service center DZ. Again a subscriber in the first telecommunication system TKS1 may send such a message to a remote telecommunication subscriber or the telecommunication system subscriber may receive such a message from the remote telecommunication subscriber.

With INTERNAL communication, the mobile elements involved generally communicate again via the base station BS, with the base station assuming control of the communication (connection) and forwarding the data to be transmitted for the actual useful data transmission. The mobile elements, which are connected via the air interface LSS to the base station BS, may again transmit the data mutually without involving the base station BS in the course of a so-called point to point connection, where they are responsible both for controlling the connection and for the actual useful data transmission.

The cordless mobile elements MT of the third telecommunication system TKS3, which are connected via the air interface LSS to the cordless base station BS configured as a network interface module NSSM or base station card, are again either cordless INPUT/OUTPUT mobile boxes MB, so-called cordless I/O mobile boxes, an I/O & set-top mobile box MB, STB or telecommunication handsets TKHA configured as cordless user-friendly telephone handsets with a user interface (operator interface) comprising a keypad or voice control as well as a display device with menu control.

As an alternative to the third telecommunication system TKS3 shown in FIG. 3, a telecommunication system can be modified such that, instead of the cordless user-friendly telephone handset, a mobile telephone with the same or comparable features (e.g. a GSM or 3GPP mobile) is used with a cordless interface for cordless connection to the cordless base station BS and to the other cordless mobile elements MT.

The different I/O mobile boxes MB and the I/O & set-top mobile box MB, STB in the third telecommunication system TKS3 are again connected to various devices and equipment for the smart home scenario. Three I/O mobile boxes MB are therefore connected as first mobile elements MT1 to a HIFI unit HA and two electrical appliances ELG, a washing machine and an electric cooker and the I/O & set-top mobile box MB, STB is connected to a television FA. The connection between the television FA and the first mobile element MT1 is again preferably a circuit connection SCART, S-VIDEO and the connection between the HIFI unit HA and the second mobile element MT2 is again preferably a circuit connection CINCH, S/PDIF, the connection between the two electrical appliances ELG, the washing machine and electric cooker, is again preferably a circuit connection EIB, LON, LCN, KNX.

It should be pointed out here that the integration solution (network interface module or base station card) discussed with the base station <----> personal computer assignment is of course also possible with the television FA, the HIFI unit HA and the electrical appliances ELG.

The electrical appliances ELG, the television FA, the HIFI unit HA, the personal computer PC, the base station BS and the I/O mobile boxes MB configured as the first mobile element MT1 are all connected to a power supply network for power supply purposes.

In contrast, the telecommunication handsets TKHA are configured as second mobile elements MT2 and also connected to the base station BS via the air interface LSS, are again battery operated, while the I/O and set-top mobile box MB, STB belonging to the first mobile elements MT1 and connected to the base station BS via the air interface LSS is connected to the power supply network SVN like the I/O mobile boxes MB. The set-top box STB again receives a DVB signal DVB-T/S/C and converts said DVB signal in the known manner to an Analog Signal/Digital Signal AS/DS for the television FA and the HIFI unit HA.

In the third telecommunication system TKS3, as in the first and second telecommunication systems TKS1, TKS2, text, audio, video and/or control data TAVS is transmitted between the mobile elements MT1, MT2 and the base station BS, between the mobile elements MT1, MT2 and between the mobile elements MT1, MT2 and the base station BS on the one hand and the circuit-switched network LVN and the packet-switched network PVN including the service center DZ assigned to these networks on the other hand. As the data can again be transmitted from any device or equipment in the third telecommunication system TKS3 to another device or other equipment in the telecommunication system TKS1 and these devices or equipment therefore operate as data source/data sink, such as the personal computer PC, the television FA, the HIFI unit HA and the electrical appliances ELG as well as the service center DZ. The personal computer PC is again referred to as the first INTERNAL data source/data sink I-DQS1 because of its structural unity with the base station BS. The television FA, HIFI unit HA and electrical appliances ELG are again also referred to as the second INTERNAL data source/data sink I/DQS2 due to their locational proximity to the base station BS and their assignment to the first mobile element MT1. The service center DZ is again referred to as the EXTERNAL data source/data sink E-DQS due to its association with the circuit-switched network LVN and the packet-switched network PVN and therefore its locational remoteness from the base station BS.

For the smart home scenario it is again possible that the mobile elements MT1, MT2 and the base station BS may be configured as further data sources/data sinks.

The text, audio, video and/or control data TAVS transmitted in the third telecommunication system TKS3 for the smart home scenario can again be supplied as follows:

The text data is preferably short messages according to the Short Message Service or video text information.

The audio data is preferably telephone call information, music information according to the Multimedia Message Service or audio downloads from the internet, e.g. MP3 files.

The video data is preferably image information according to the Multimedia Message Service or video downloads from the internet.

The control data finally is data for controlling, measuring, regulating, calibrating, diagnosing and/or maintaining electrical appliances.

To tailor the physical resources of the third telecommunication system TKS3 for wireless communication and telecommunication in the smart home environment again optimally to the data to be transmitted (e.g. voice and text data on the one hand and packet, audio and video data on the other hand) and to the quantity of data generally associated therewith, the third telecommunication system TKS3 is again preferably configured such that different air interfaces that are optimally designed for the respective data transmission are available for the different types of data mentioned. The air interface LSS may therefore again include a shared interface for telephony and broadband data transmission or again a separate interface for telephony and broadband data transmission respectively.

It is understood that the air interface LSS may be an interface based on DECT, WDCT, DECT and Bluetooth, WDCT and Bluetooth, DECT and IEEE 802.11 a, DECT and IEEE 802.11b, DECT and IEEE 802.11g, WDCT and IEEE 802.11 a, WDCT and IEEE 802.11b, WDCT and IEEE 802.11 g, GSM and DECT, GSM and Bluetooth, GSM and IEEE 802.11 a, GSM and IEEE 802.11b, GSM and IEEE 802.11 g, 3GPPP and Bluetooth, 3GPP and IEEE 802.11 a, 3GPP and IEEE 802.11b or 3GPP and IEEE 802.11g or any other similar standards known in the art.

FIG. 4 shows a first message sequence chart according to a first smart home scenario, in which the user of a second mobile element MT2 of the telecommunication systems TKS1, TKS2, TKS3 shown in FIGS. 1 to 3, configured as a telecommunication handset TKHA uses mobile element MT2 to wake up the personal computer PC from standby mode and start it up. The message sequence required for this operates according to FIG. 4 between the second mobile element MT2, the first mobile element MT 1 connected to the second mobile element MT2 via the air interface LSS and configured as an I/O mobile box MB or an I/O mobile box card MBK and the personal computer PC connected to the first mobile element MT1 via the circuit connection USB, ETHERNET and configured as the first INTERNAL data source/data sink I-DQS1.

The units or components taken into account to represent the message sequence are:

(i) for the mobile element MT2 a user interface BSS, preferably having a keypad TA and a display device AV configured as a display screen, an MT storage unit MT-S, a central control unit MT-P configured as an MT processor and a shared MT/MB air interface MT/MB-LSS operating between the mobile element MT2 and the I/O mobile box MB, which are connected together in the manner shown, (ii) for the I/O mobile box, the MT/MB air interface MT/MB-LSS shared with the mobile element MT2, a central control unit MB-P configured as an MB processor and a USB/ETHERNET interface USB/ETH-SS, which are connected together in the manner shown, and (iii) for the personal computer PC, as with the I/O mobile box MB, a USB/ETHERNET interface USB/ETH-SS, a power manager PM, a central control unit PC-P configured as a PC processor and a PC storage unit PC-S, which are connected together in the manner shown.

In an initial state AZ of the message sequence chart applicable to all units and components, the personal computer PC is in standby mode and is woken up from this state by the mobile element MT2 and started up. To this end a control command "Wake up and start PC" STK is transmitted from the keypad TA of the user interface BSS to the MT processor MT-P. To set up an internal communication connection, the MT processor MT-P transmits a set-up message "Internal communication connection" AUM via the MT/MB air interface MT/MB-LSS to the MB processor MB-P. The MB processor MB-P then sends a confirmation message BM via the MT/MB air interface MT/MB-LSS back to the MT processor MT-P. The MT processor MT-P then transmits the command data "Wake up and start PC" KD belonging to the control command "Wake up and start PC" via the MT/MB air interface MT/MB-LSS, the MB processor MB-P, the USB/ETHERNET interface USB/ETH-SS in the I/O mobile box MB and the personal computer PC to the power manager PM. The power manager PM transmits a response message "PC woken up and started" AWM in the reverse direction via the same route to the MT processor MT-P. The MT processor MT-P then outputs display data "PC woken up and started" AD to the display screen AV of the user interface BSS, where said data is displayed. To cancel the internal communication connection that has been set up, the MT processor MT-P then transmits a cancellation message "Internal communication connection" ABM via the MT/MB air interface MB/MT-LSS to the MB processor MB-P, which responds to it in the reverse direction via the same route with a further confirmation message BM, as a result of which the connection is canceled.

Figure 5A:
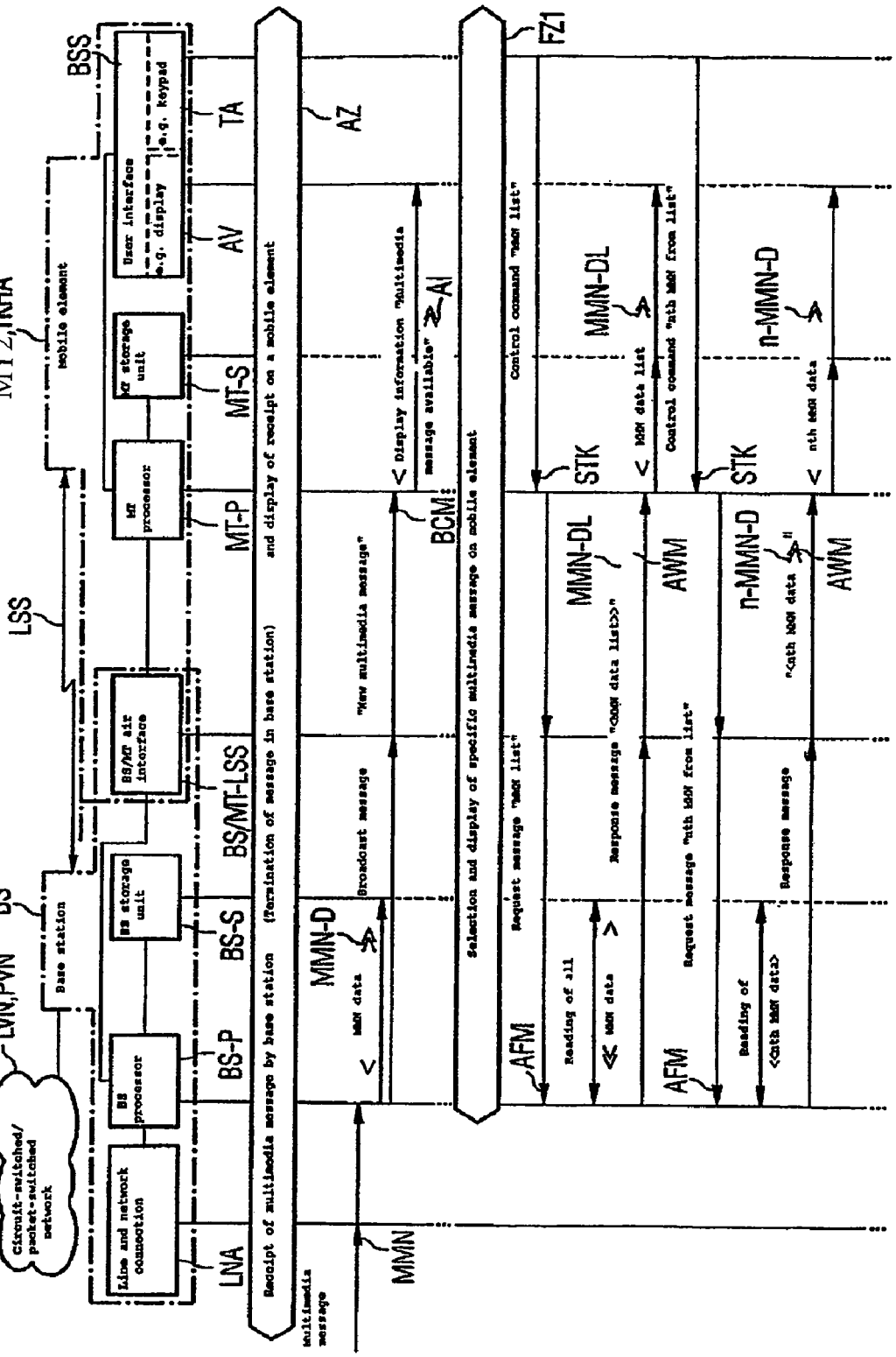
FIGS. 5a to 5c illustrate a second message sequence chart, wherein the user of a mobile element of the telecommunication systems shown in FIGS. 1 to 3 uses this to display and process a multimedia message terminated in a base station and to create a new multimedia message (second smart home scenario)
Figure 5B:
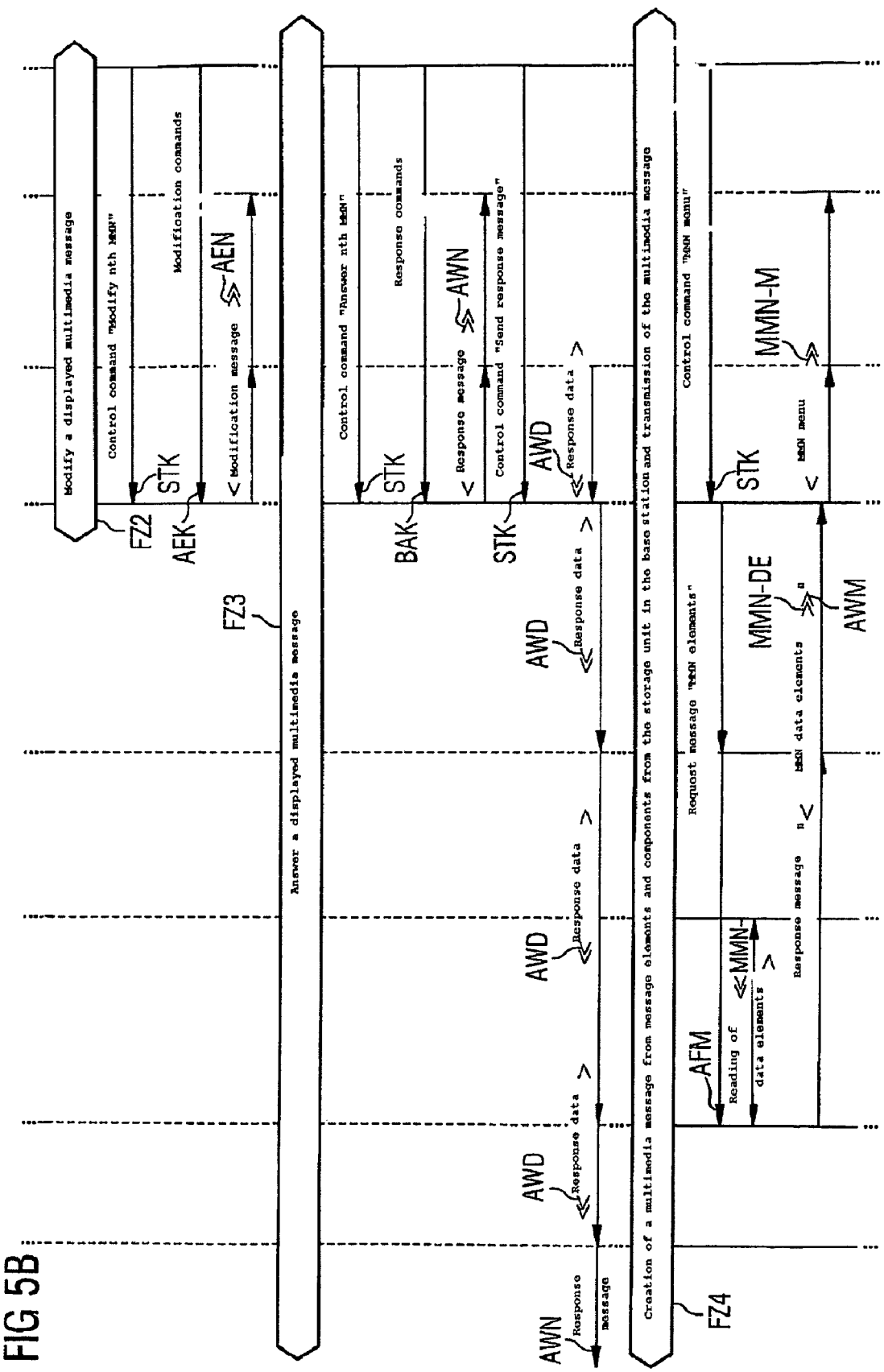
Figure 5C:
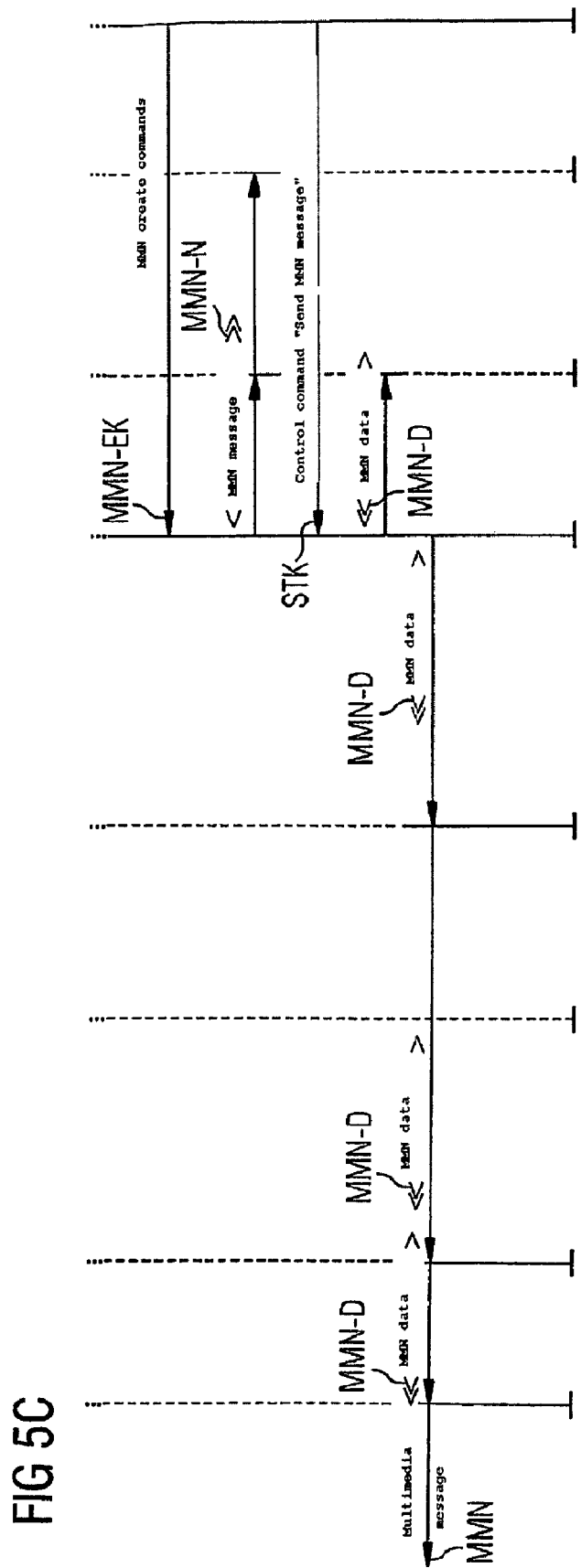

FIGS. 5a to 5c show a second message sequence chart according to a second smart home scenario, in which the user of the second mobile element MT2 of the telecommunication systems TKS1, TKS2, TKS3 shown in FIGS. 1 to 3 configured as a telecommunication handset TKHA uses said mobile element MT2 to display and process a multimedia message terminated in the base station BS and to create a new multimedia message. The message sequence required for this operates according to FIGS. 5a to 5c between the circuit-switched and/or packet-switched network LVN, PVN, the base station BS connected to the network LVN, PVN via the circuit connection a/b, xDSL, ETHERNET and the second mobile element MT2 connected to the base station BS via the air interface LSS.

The units or components taken into account to represent the message sequence are:

(i) for the base station BS, a line and network connection LNA, a central control unit BS-P configured as a BS processor, a BS storage unit BS-S and a shared BS/MT air interface BS/MT-LSS operating between the base station BS and the mobile element MT2, which are connected together in the manner shown, and (ii) for the second mobile element MT2 the BS/MT air interface BS/MT-LSS shared with the base station BS, a central control unit MT-P configured as an MT processor, an MT storage unit MT-S and a user interface BSS, having for example a keypad TA and a display device AV configured as a display screen, with the components of the mobile element MT2 being connected together in the manner shown.

In an initial state AZ of the message sequence chart applicable to all units and components, a multimedia message MMN is received by the base station BS (termination of message in the base station) and receipt of the multimedia message MMN is displayed on the mobile element MT2. To this end the multimedia message MMN is transmitted from the circuit-switched/packet-switched network LVN, PVN via the line and network connection LNA to the BS processor BS-P. The BS processor BS-P stores MMN data MMN-D corresponding to the multimedia message MMN in the BS storage unit BS-S. The BS processor BS-P then sends a broadcast message "New multimedia message" BCM via the BS/MT air interface BS/MT-LSS to the MT processor MT-P. The MT processor MT-P then outputs display information "Multimedia message available" AI to the display screen AV of the user interface BSS, where said information is displayed.

In a subsequent first consequential state FZ1 of the message sequence chart applicable to all units and components apart from the line and network connection LNA, a specific (nth) multimedia message MMN terminated in the base station BS is selected by the mobile element MT2 and displayed on it. To this end a control command "MMN list" STK is transmitted from the keypad TA of the user interface BSS to the MT processor MT-P. The MT processor MT-P sends a request message "MMN list" AFM via the BS/MT air interface BS/MT-LSS to the BS processor BS-P. As a result of this request message the BS processor BS-P reads all the MMN data from the BS storage unit BS-S. After this reading process, the BS processor BS-P sends a response message AWM with an MMN data list MMN-DL via the BS/MT air interface BS/MT-LSS to the MT processor MT-P. In the MT processor MT-P the MMN data list MMN-DL is buffered in the MT storage unit MT-S and output to the display screen AV of the user interface BSS, where the MMN data list MMN-DL is displayed. A control command "nth MMN from list" STK is then transmitted from the keypad TA of the user interface BSS to the MT processor MT-P. The MT processor MT-P then sends a request message "nth MMN from list" AFM via the BS/MT air interface BS/MT-LSS to the BS processor BS-P. As a result of this received request message the BS processor BS-P reads the nth MMN data from the BS storage unit BS-S. After the end of the reading process the BS processor BS-P transmits the read nth MMN data n-MMN-D in a response message AWM via the BS/MT air interface BS/MT-LSS to the MT processor MT-P. The MT processor MT-P stores the transmitted nth MMN data n-MMN-D in the MT storage unit MT-S and outputs it to the display screen AV of the user interface BSS where said data or the nth multimedia message is displayed.

In a subsequent second consequential state FZ2 of the message sequence chart applicable to the units and components "MT processor, MT storage unit, user interface/display and user interface/keypad" a displayed multimedia message, e.g. the nth multimedia message, is modified. To this end a control command "Modify nth MMN" STK is transmitted from the keypad TA of the user interface BSS to the MT processor MT-P. After the control command STK has been transmitted, modification commands AEK are sent from the keypad TA to the MT processor MT-P. As a result of these modification commands AEK, the MT processor MT-P generates a modification message, which is stored in the MT storage unit MT-S and output to the display screen AV of the user interface BSS, where the modification message AEN is displayed.

In a subsequent state FZ3 of the message sequence chart again applicable to all units and components, a displayed multimedia message, e.g. the modified nth multimedia message, is answered. To this end a control command "Answer nth MMN" STK is transmitted from the keypad TA of the user interface BSS to the MT processor MT-P. After transmission of the control command STK, response commands BAK are transmitted from the keypad TA to the MT processor MT-P. As a result of these response commands BAK, the MT processor MT-P generates a response message AWN, which is stored in the MT storage unit MT-S and output to the display screen AV of the user interface BSS, where the response message AWN is displayed. A control command "Send response message" STK is then transmitted from the keypad TA of the user interface BSS to the MT processor MT-P. The MT processor MT-P reads response data AWD in the response message ANN from the MT storage unit MT-S and transmits the response data AWD via the BS/MT air interface BS/MT-LSS and the BS processor BS-P to the line and network connection LNA, from which the response message AWN corresponding to the response data AWD is sent to the circuit-switched/packet-switched network LVN, PVN.

In a subsequent state FZ4 of the message sequence chart, again applicable to all units and components, a multimedia message is created from message elements or message components from the storage unit BS-S in the base station BS and then sent. To this end a control command "MMN menu" STK is transmitted from the keypad TA of the user interface BSS to the MT processor MT-P. The MT processor MT-P then sends a request message "MMN elements" AFM via the BS/MT air interface BS/MT-LSS to the BS processor BS-P. As a result of this request message the BS processor BS-P reads all the MMN data elements from the BS storage unit BS-S. After this reading process the BS processor BS-P sends a response message AWM with MMN data elements MMN-DE via the BS/MT air interface BS/MT-LSS to the MT processor MT-P. In the MT processor MT-P an MMN menu MMN-M is generated from the MMN data elements MMN-DE. This menu is buffered in the MT storage unit MT-S and output to the display screen AV of the user interface BSS, where the MMN menu MMN-M is displayed. MMN create commands MMN-EK are then transmitted from the keypad TA of the user interface BSS to the MT processor MT-P. The MT processor MT-P creates an MMN message MMN-N from these MMN create commands, which is stored in the MT storage unit MT-S and output to the display screen AV of the user interface BSS where the MMN message MMN-N is displayed. A control command "Send MMN message" STK is then transmitted from the keypad TA of the user interface BSS to the MT processor MT-P. The MT processor MT-P reads MMN data MMN-D corresponding to the MMN message from the MT storage unit MT-S and transmits the MMN data MMN-D via the BS/MT air interface BS/MT-LSS and the BS processor BS-P to the line and network connection LNA, from which the multimedia message MMN corresponding to the MMN data MMN-D is sent to the circuit-switched/packet-switched network LVN, PVN.

FIG. 6 shows a third message sequence chart according to a third smart home scenario, in which the user of the second mobile element MT2 of the telecommunication systems TKS1, TKS2, TKS3 shown in FIGS. 1 to 3 is configured as a telecommunication handset TKHA and uses mobile element MT2 to receive a multimedia message, i.e. to terminate a multimedia message in said mobile element MT2 and display it. The message sequence required for this operates according to FIG. 6 between the circuit-switched and/or packet-switched network LVN, PVN, the base station BS connected to the network LVN, PVN via the circuit connection a/b, xDSL, ETHERNET and the second mobile element MT2 connected to the base station BS via the air interface LSS.

The units or components taken into account to represent the message sequence are (i) for the base station BS, a line and network connection LNA, a central control unit BS-P configured as a BS processor, a BS storage unit BS-S, and a shared BS/MT air interface BS/MT-LSS operating between the base station BS and the mobile element MT2, which are connected together in the manner shown, and (ii) for the second mobile element MT2 the BS/MT air interface BS/MT-LSS shared with the base station BS, a digital network interface DNA (e.g., as a modem or ISDN-Dchannel), a central control unit MT-P configured as an MT processor, an MT storage unit MT-S and a user interface BSS, having a keypad TA and a display device AV configured as a display screen for example, with the components of the mobile element MT3 being connected together in the manner shown.

In an initial state AZ of the message sequence chart applicable to all units and components, a multimedia message MMN is received by the mobile element MT2 (termination of message in the mobile element) and receipt of the multimedia message MMN is displayed on the mobile element MT2. To this end the multimedia message MMN is transmitted from the circuit-switched/packet-switched network LVN, PVN via the line and network connection LNA to the BS processor BS-P, whereupon the BS processor BS-P then sends a broadcast message "New multimedia message" BCM via the BS/MT air interface BS/MT-LSS and the digital network interface DNA to the MT processor MT-P. The MT processor MT-P then outputs display information "Multimedia message available" AI to the display screen AV of the user interface BSS, where said information is displayed. A control command "Set up communication connection to MMN service center" STK is then transmitted from the keypad TA of the user interface BSS to the MT processor MT-P. To set up a communication connection to the MMN service center, the MT processor MT-P transmits a set-up message "Communication connection to MMN service center" AUM via the digital network interface DNA and the BS/MT air interface BS/MT-LSS to the BS processor BS-P. The BS processor BS-P then sets up the communication connection to the MMN service center in the circuit-switched/packet-switched network LVN, PVN via the line and network connection LNA. If the BS processor BS-P then receives confirmation of the setting up of the communication connection via the line and network connection LNA from the circuit-switched/packet-switched network LVN, PVN, it sends a confirmation message "Setting up of communication connection" BM via the BS/MT air interface BS/MT-LSS and the digital network interface DNA to the MT processor MT-P.

A control command "Retrieve multimedia message" STK is then transmitted from the keyboard TA of the user interface BSS to the MT processor MT-P. The MT processor MT-P then sends a request message "Retrieve multimedia message" AFM via the digital network interface DNA and the BS/MT air interface BS/MT-LSS to the BS processor BS-P. The BS processor BS-P then retrieves the multimedia message from the circuit-switched/packet-switched network LVN, PVN via the line and network connection LNA and the communication connection to the MMN service center. If the BS processor BS-P then receives MMN data MMN-D from the circuit-switched/packet-switched network LVN, PVN via the line and network connection LNA, it sends a response message AWM with the MMN data MMN-D via the BS/MT air interface BS/MT-LSS and the digital network interface DNA to the MT processor MT-P. The MT processor MT-P stores the transmitted MMN data MMN-D in the MT storage unit MT-S and outputs it to the display screen AV of the user interface BSS, where said data or the multimedia message is displayed. To cancel the communication connection to the MMN service center, the MT processor MT-P then transmits a cancellation message "Communication connection to MMN service center" ABM via the digital network interface DNA and the BS/MT air interface BS/MT-LSS to the BS processor BS-P. The BS processor BS-P then cancels the communication connection to the MMN service center in the circuit-switched/packet-switched network LVN, PVN via the line and network connection LNA. If the BS processor BS-P then receives confirmation of the cancellation of the communication connection via the line and network connection LNA from the circuit-switched/packet-switched network LVN, PVN, it sends a confirmation message "Cancellation of communication connection" BM via the BS/MT air interface BS/MT-LSS and the digital network interface DNA to the MT processor MT-P, as a result of which the connection is canceled.

Figure 7A:
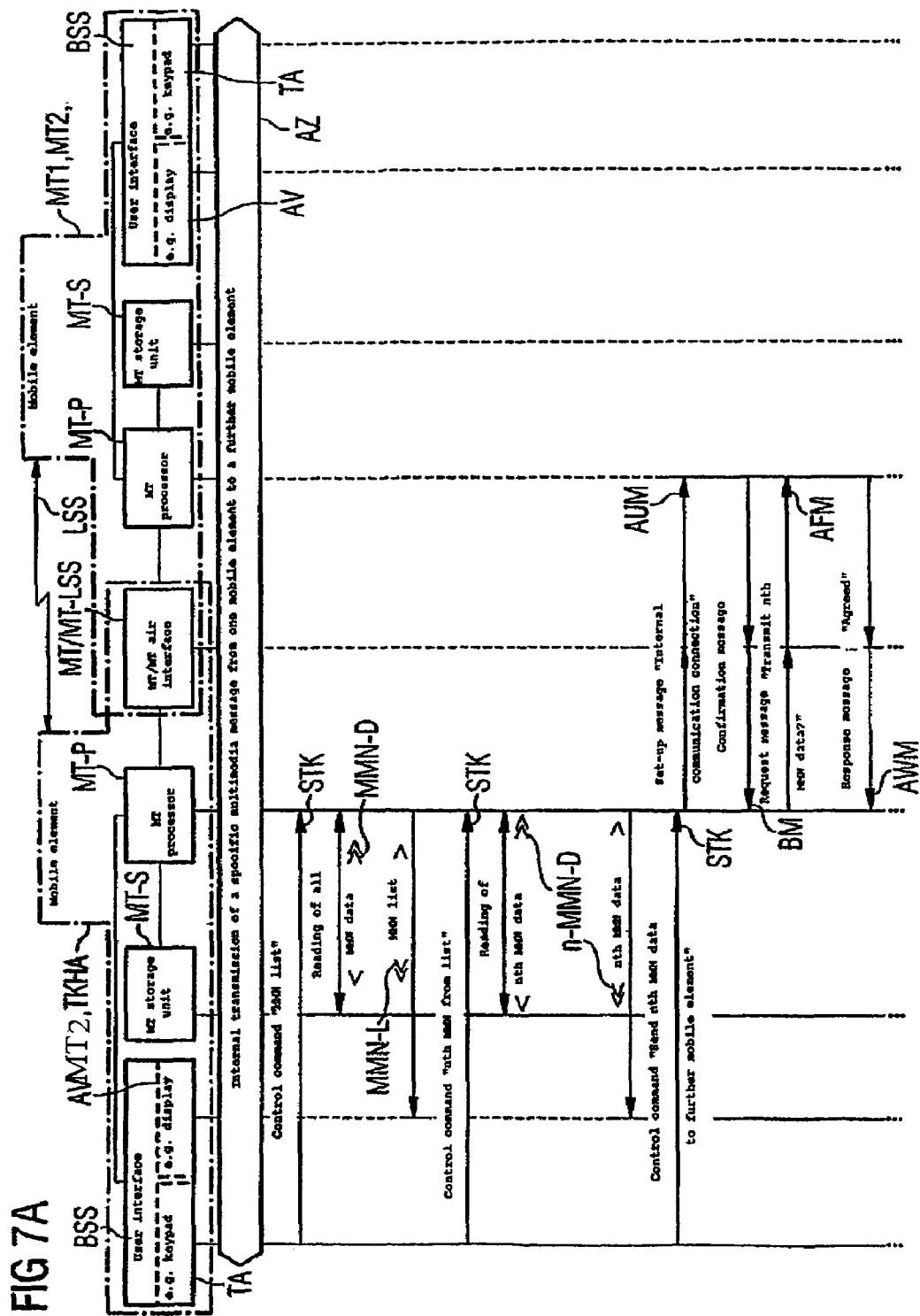
FIGS. 7a and 7b illustrate a fourth message sequence chart, according to which the user of a mobile element of the telecommunication systems shown in FIGS. 1 to 3 transmits a multimedia message to another mobile element (fourth smart home scenario)
Figure 7B:
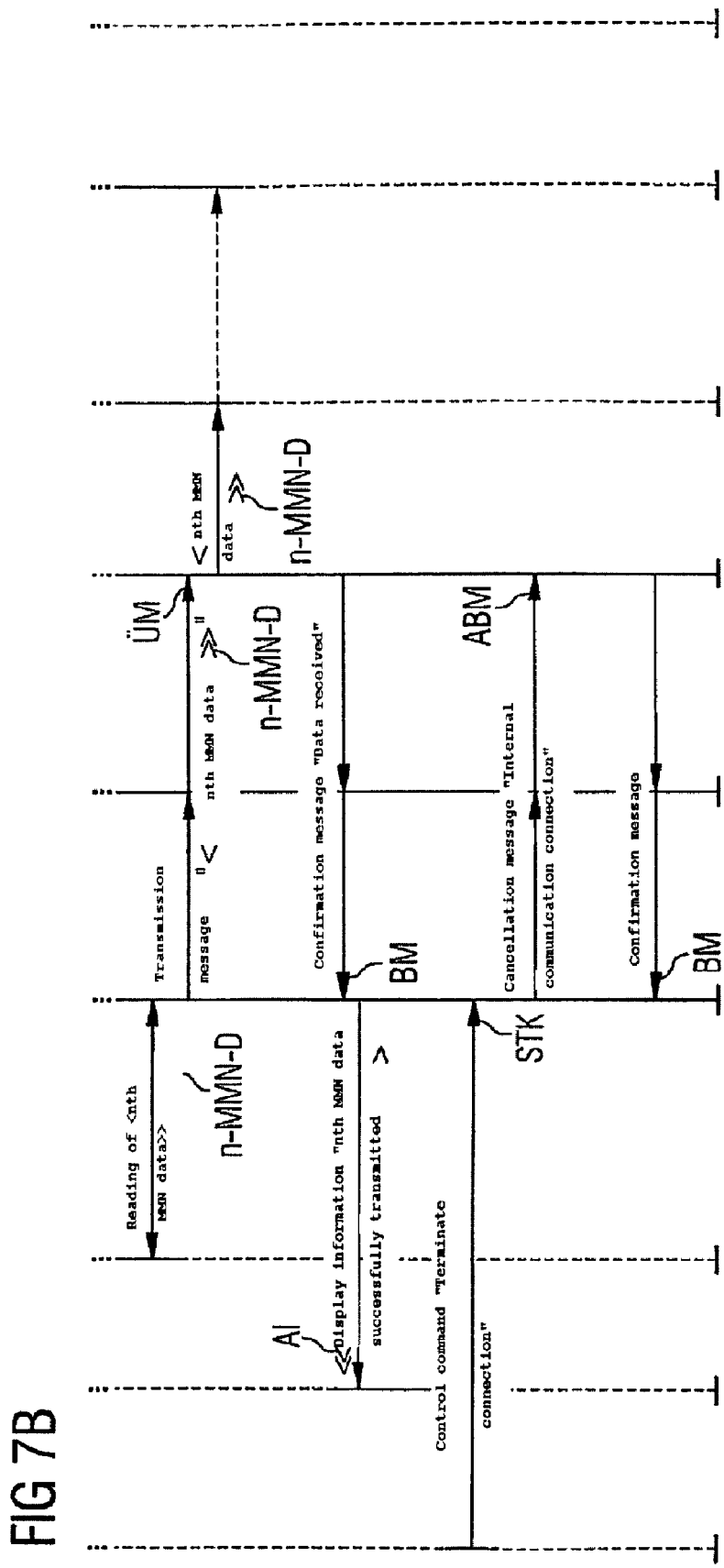

FIGS. 7a and 7b show a fourth message sequence chart according to a fourth smart home scenario, in which the user of the second mobile element MT2 of the telecommunication systems TKS1, TKS2, TKS3 shown in FIGS. 1 to 3 configured as a telecommunication handset TKHA transmits a specific (nth) multimedia message internally from said mobile element MT2 to another mobile element, e.g. the first mobile element MT1 or a further second mobile element MT2. The message sequence required for this operates according to FIGS. 7a and 7b between the second mobile element MT2 and the further mobile element MT I, MT2 connected to this directly via the air interface LSS (point to point connection) or indirectly via the base station BS.

The units or components taken into account to represent the message sequence are (i) for the mobile element MT2 a user interface BSS, having a keypad TA and a display device AV configured as a display screen for example, an MT storage unit MT-S, a central control unit MT-P configured as an MT processor and a shared MT/MT air interface MT/MT-LSS operating between the mobile element MT2 and the further mobile element MT1, MT2, which are connected together in the manner shown, and (ii) for the further mobile element MT1, MT2 the MT/MT air interface MT/MT-LSS shared with the second mobile element MT2, a central control unit MT-P configured as an MT processor, an MT storage unit MT S and a user interface BSS, having for example a keypad TA and a display device AV configured as a display screen, with the components of the mobile element MT2 being connected together in the manner shown.

In an initial state AZ of the message sequence chart applicable to all units and components, an nth multimedia message MMN is transmitted internally from the second mobile element MT2 to a further mobile element MT1, MT2. To this end a control command "MMN list" STK is transmitted from the keyboard TA of the user interface BSS to the MT processor MT-P. The MT processor then reads all the MMN data from the MT storage unit MT-S. After this reading process the MT processor MT-P outputs an MMN list MMN-L to the display screen AV of the user interface BSS, where said MMN list MMN-L is displayed. A control command "nth MMN from list" STK is then transmitted from the keypad TA of the user interface BSS to the MT processor MT-P. The MT processor MT-P then reads nth MMN data n-MMN-D from the MT storage unit MT-S. After the end of the reading process the MT processor MT-P outputs the read nth MMN data n-MMN-D to the display screen AV of the user interface BSS, where said data is displayed. A control command "Send nth MMN data to further mobile element" STK is then transmitted from the keypad TA of the user interface BSS to the MT processor MT-P. To cancel an internal communication connection, the MT processor MT-P transmits a cancellation message "Internal communication connection" AUM via the MT/MT air interface MT/MT-LSS to the MT processor MT-P of the further mobile element MT1, MT2. This MT processor MT-P then sends a confirmation message BM via the MT/MT air interface MT/MT-LSS back to the MT processor MT-P of the second mobile element MT2. The MT processor MT-P then sends a request message "Transmit nth MMN data?" AFM via the MT/MT air interface MT/MT-LSS to the MT processor MT-P of the further mobile element MT1, MT2. In response this MT processor MT-P sends a response message "Agreed" AWM via the MT/MT air interface MT/MT-LSS back to the MT processor MT-P of the second mobile element MT2. As a result of this response message AWM the MT processor MT-P reads the nth MMN data n-MMN-D from the MT storage unit MT-S. After this reading process the MT processor MT-P sends a transmission message UM with the nth MMN data n-MMN-D via the MT/MT air interface MT/MT-LSS to the MT processor MT-P of the further mobile element MT I, MT2. This MT processor MT-P then stores the nth MMN data n-MMN-D in the MT storage unit MT-S and optionally outputs it to the display screen AV of the user interface BSS, where said data can be displayed. The MT processor MT-P then sends a confirmation message "Data received" BM via the MT/MT air interface MT/MT-LSS to the MT processor MT-P of the second mobile element MT2. As a result of this received confirmation message BM the MT processor MT-P outputs display information "nth MMN data successfully transmitted" AI to the display screen AV of the user interface BSS of the second mobile element MT2, where the information is displayed. A control command "Terminate connection" STK is then transmitted from the keypad TA of the user interface BSS to the MT processor MT-P of the second mobile element MT2, whereupon, to cancel the internal communication connection that has been set up, the MT processor MT-P sends a cancellation message "Internal communication connection" ABM via the MT/MT air interface MT/MT-LSS to the MT processor MT-P of the further mobile element MT I, MT2, which responds to this in the reverse direction via the same route with a further confirmation message BM, as a result of which the connection is canceled.

Figure 8B:
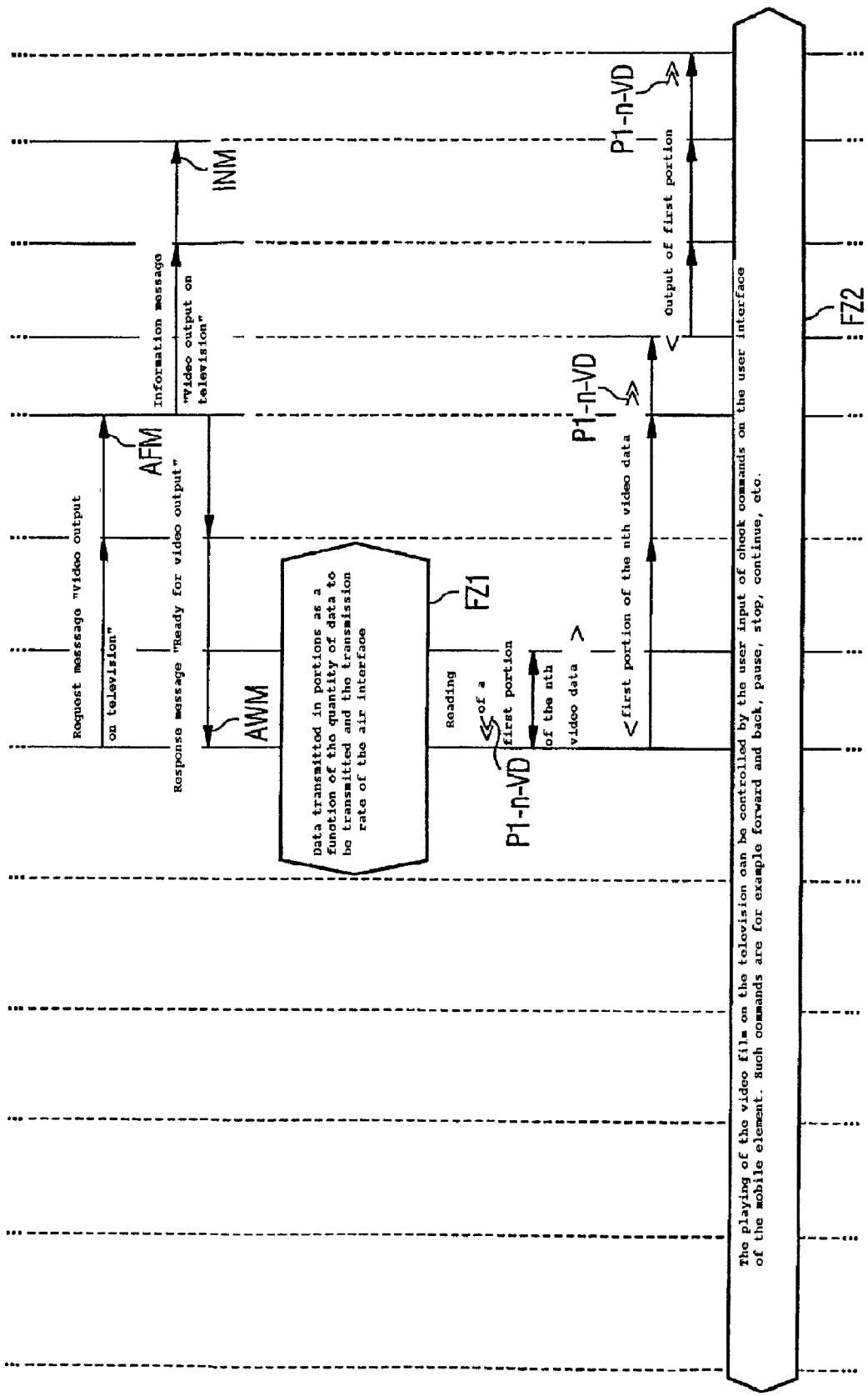
Figure 8C:
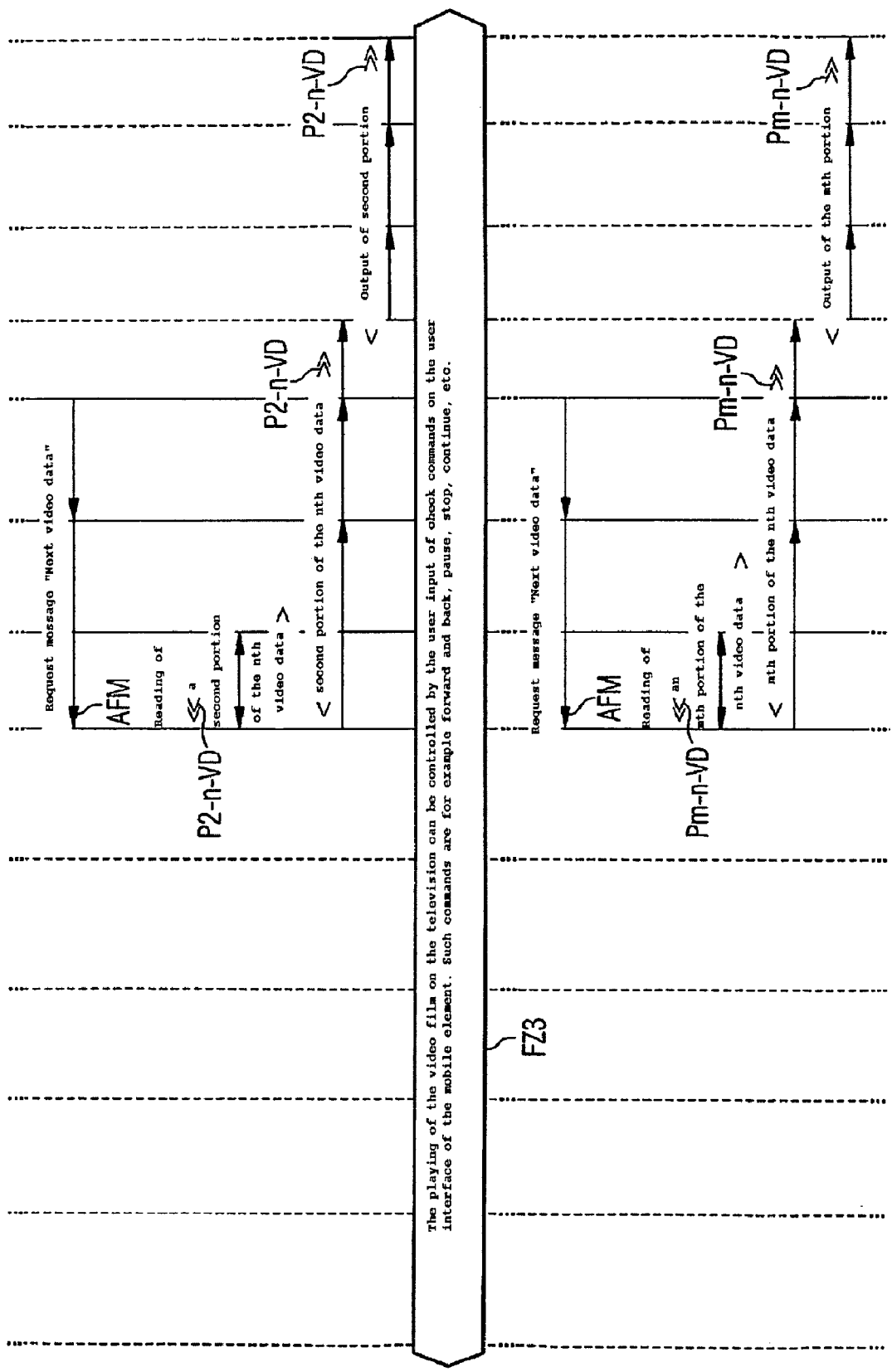
Figure 9B:
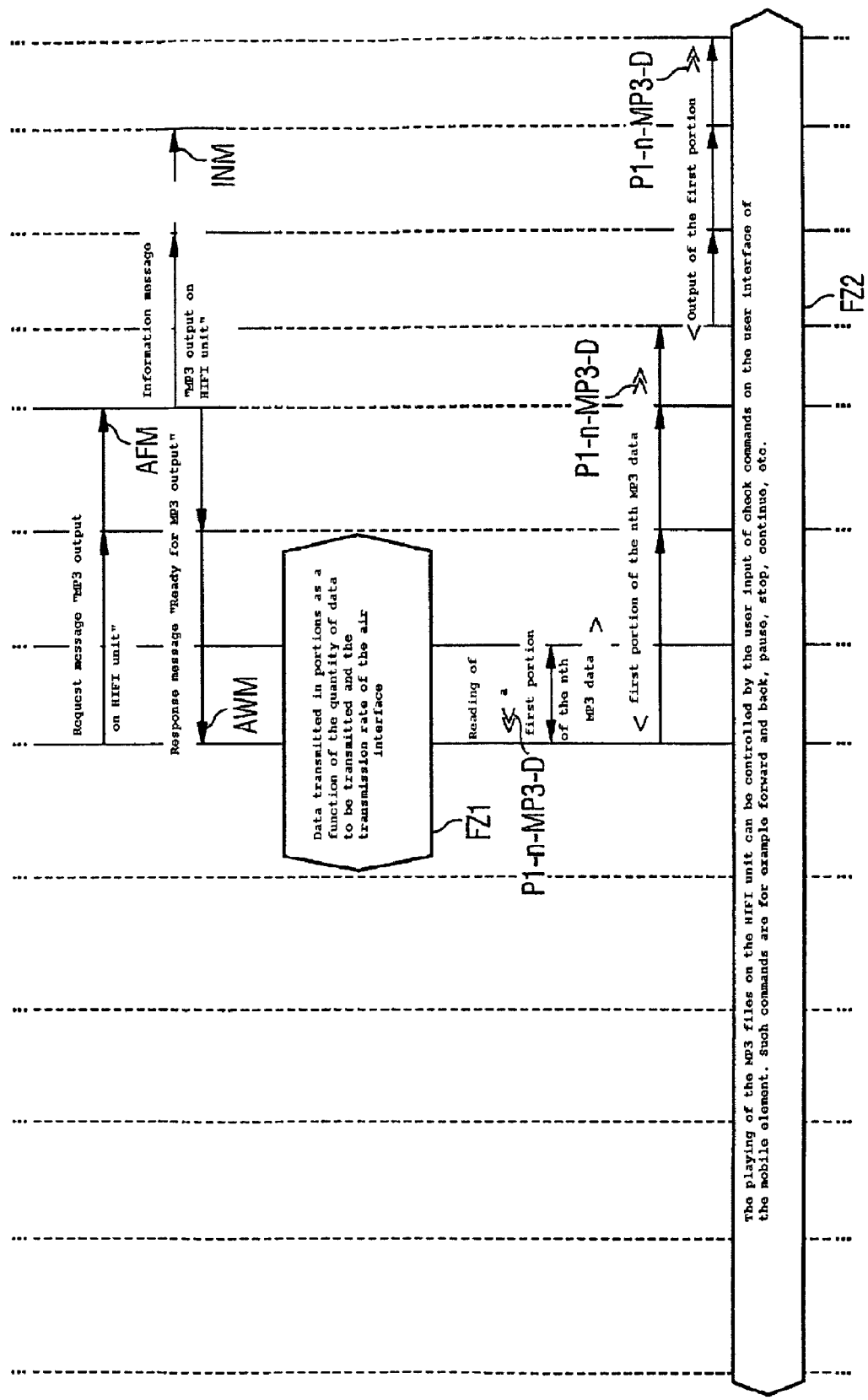
Figure 9C:
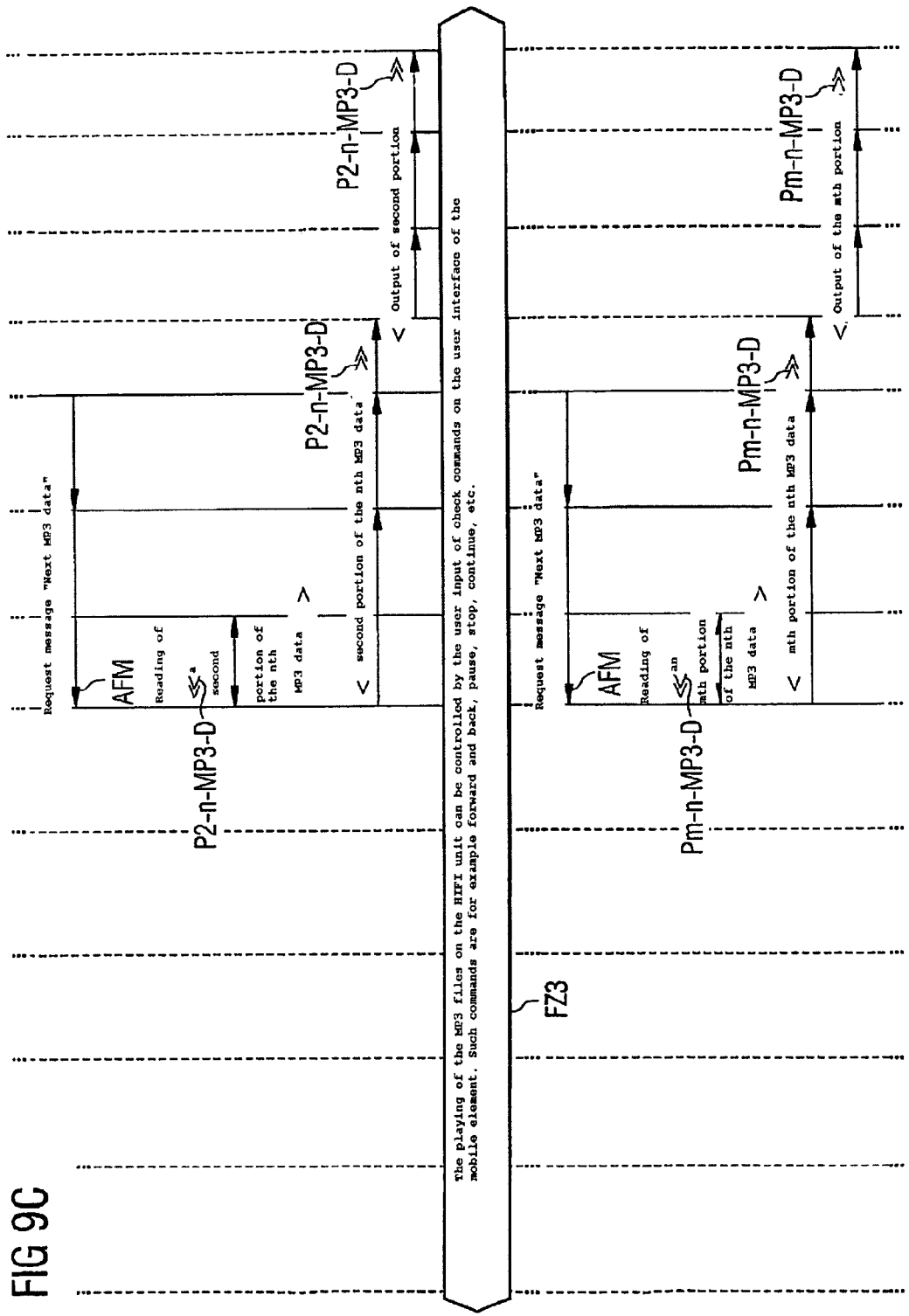
Figure 9D:
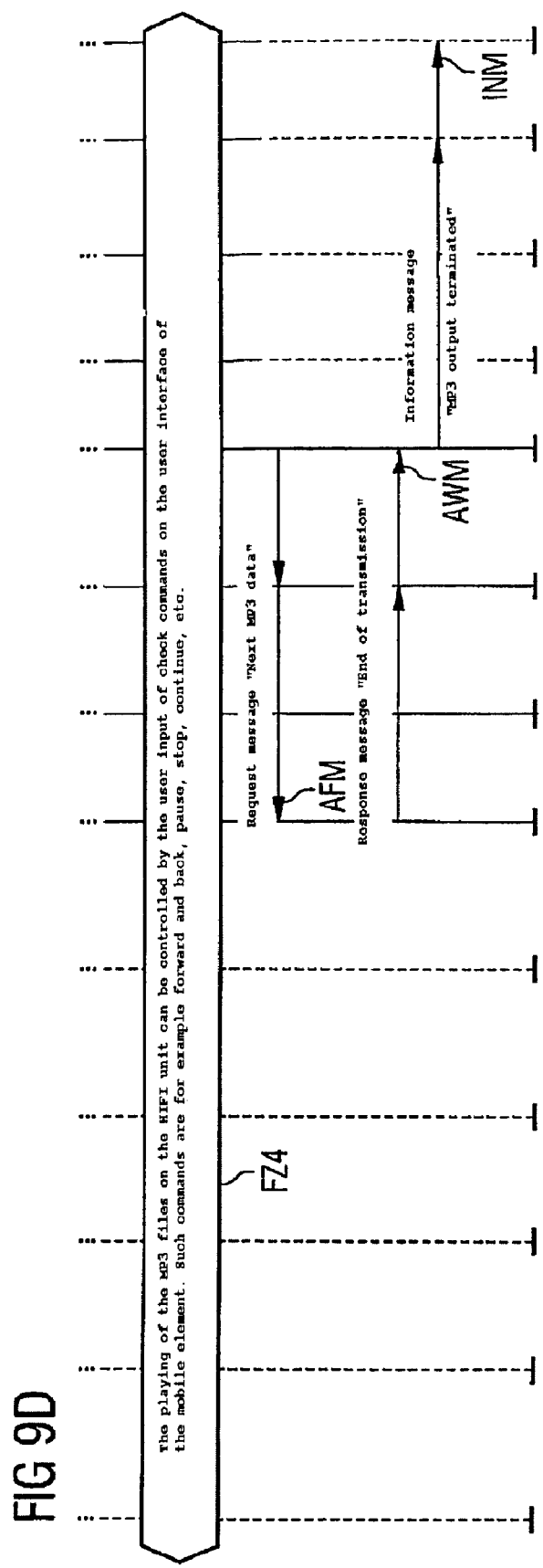

FIGS. 8a to 8b show a fifth message sequence chart according to a fifth smart home scenario, in which the user of the second mobile element MT2 of the telecommunication systems TKS1, TKS2, TKS3 shown in FIGS. 1 to 3, configured as a telecommunication handset TKHA, watches a video film, which is stored on the personal computer PC, on the television FA. The message sequence required for this operates according to FIGS. 8a to 8c between the third mobile element MT3, the personal computer PC connected directly to the third mobile element MT3 via the air interface LSS (point to point connection) or indirectly via the base station BS, with the integrated I/O mobile box card MBK according to FIGS. 1 and 3, the I/O mobile box MB connected to the personal computer PC via the air interface LSS and the television FA connected to the I/O mobile box MB via the circuit connection SCART, S-VIDEO.

The units or components taken into account to represent the message sequence are (i) for the mobile element MT2 a user interface BSS, having a keypad TA and a display device AV configured as a display screen for example, an MT storage unit MT-S, a central control unit MT-P configured as an MT processor and a shared PC/MT air interface PC/MT-LSS operating between the mobile element MT2 and the personal computer PC with the integrated I/O mobile box card MBK, which are connected together in the manner shown, (ii) for the personal computer with the integrated I/O mobile box card MBK the PC/MT air interface PC/MT-LSS shared with the mobile element MT2, a central control unit MT-P configured as an MT processor, a PC storage unit PC-S and a shared PC/MB air interface PC/MB-LSS operating between the personal computer PC with the integrated I/O mobile box card MBK and the I/O mobile box MB, which are connected together in the manner shown, (iii) for the PO mobile box MB the PC/MB air interface PC/MB-LSS shared with the personal computer PC with the integrated I/O mobile box card MBK, a central control unit MB-P configured as an MB processor, an MB storage unit MB-S and a shared data interface DSS operating between the I/O mobile box MB and the television FA, which are connected together in the manner shown, (iv) for the television FA the data interface DSS shared with the I/O mobile box MB, a central control unit FA-P configured as an FA processor and an FA screen FA-B, which are connected together in the manner shown.

In an optional preliminary state VZ of the message sequence chart, applicable to all units and components, both the personal computer PC and the television FA can be in standby mode and be woken up and started up from this state by the mobile element MT2 according to the wake-up procedure described in FIG. 4. In a subsequent initial state AZ of the message sequence chart applicable to all units and components, a video film stored in the personal computer PC is output on the television FA. To this end a control command "Video list" STK is transmitted from the keypad TA of the user interface BSS by the MT processor MT-P. The MT processor MT-P transmits a request message "Video list" AFM via the PC/MT air interface PC/MT-LSS to the PC processor PC-P. As a result of this request message AFM the PC processor PC-P reads all the video data from the PC storage unit PC-S. After this reading process the PC processor PC-P sends a response message AWM with a video data list VDL via the PC/MT air interface PC/MT-LSS to the MT processor MT-P. In the MT processor MT-P the video data list VDL is buffered in the MT storage unit MT-S and output to the display screen AV of the user interface BSS, where the video data list VDL is displayed. A control command "nth video from video list to be transmitted to assigned I/O mobile box for output on television" STK is then transmitted from the keypad TA of the user interface BSS to the MT processor MT-P. The MT processor MT-P then sends a prompt message "nth video from video list to be transmitted to assigned I/O mobile box for output on television" AFFN via the PC/MT air interface PC/MT-LSS to the PC processor PC-P. After the prompt message AFFM has been transmitted, the PC processor PC-P sends a prompt message "Video output on television" AFM via the PC/MB air interface PC/MB-LSS to the MB processor MB-P, whereupon the MB processor MB-P transmits an information message "Video output on television" INM via the data interface DSS to the FA processor FA-P. When this information message INM has been sent, the MB processor MB-P sends a response message "Ready for video output" AWN via the PC/MB air interface PC/MB-LSS to the PC processor PC-P.

In a subsequent state FZ1 of the message sequence chart applicable to the units and components, the data is transmitted in portions as a function of the quantity of data to be transmitted and the transmission rate of the air interface. To this end, the PC processor PC-P reads a first portion of the nth video data P1-n-VD from the PC storage unit PC-S. After the reading process for this first portion of the nth video data P1-n-VD, the PC processor PC-P transmits this first portion of the nth video data P1-n-VD via the PC/MB air interface PC/MB-LSS to the MB processor MB-P, which transmits it to the MB storage unit MB-S for buffering and then forwards it to the FA processor FA-P via the data interface DSS, to be output to the FA screen FA-B of the television FA.

In a subsequent state FZ2 of the message sequence chart applicable to all units and components, the playing of the video film on the television FA is controlled by the user input of check commands on the user interface BSS of the mobile element. Such commands are for example, forward and back, pause, stop, continue, etc. To this end the MB processor MB-P sends a request message "Next video data" AFM via the PC/MB air interface MC/MB-LSS to the PC processor PC-P. As a result of this request message AFM the PC processor PC-P reads a second portion of the nth video data P2-n-VD from the PC storage unit PC-S. After the reading process for this second portion of the nth video data P2-n-VD, the second portion of the nth video data P2-n-VD is transmitted from the PC processor PC-P via the PC/MB air interface PC/MB-LSS to the MB processor MB-P, which transfers it to the MB storage unit MB-S for buffering and then forwards it to the FA processor FA-P via the data interface DSS, to be output to the FA screen FA-B of the television FA.

In a subsequent state FZ3 of the message sequence chart applicable to all units and components, the playing of the video film on the television FA is controlled by the user input check commands on the user interface BSS of the mobile element. Such commands are for example, forward and back, pause, stop, continue, etc. To this end the MB processor MB-P sends a request message "Next video data" AFM via the PC/MB air interface MC/MB-LSS to the PC processor PC-P. As a result of this request message AFM the PC processor PC-P reads an mth portion of the nth video data Pm-n-VD from the PC storage unit PC-S. After the reading process for this mth portion of the nth video data Pm-n-VD, the mth portion of the nth video data Pm-n-VD is transmitted from the PC processor PC-P via the PC/MB air interface PC/MB-LSS to the MB processor MB-P, which transfers it to the MB storage unit MB-S for buffering and then forwards it to the FA processor FA-P via the data interface DSS, to be output to the FA screen FA-B of the television FA.

In a subsequent state FZ4 of the message sequence chart applicable to all units and components, the playing of the video film on the television FA is controlled by the user input check commands on the user interface BSS of the mobile element. Such commands are for example, forward and back, pause, stop, continue, etc. To this end the MB processor MB-P sends a request message "Next video data" AFM via the PC/MB air interface MC/MB-LSS to the PC processor PC-P. As a result of this request message AFM, the PC processor PC-P transmits a response message "End of transmission" AWM via the PC/MB air interface PC/MB-LSS to the MB processor MB-P. The MB processor MB-P then sends an information message "Video output terminated" to the FA processor FA-P via the data interface DSS.

FIGS. 9a to 9d show a sixth message sequence chart according to a sixth smart home scenario, in which the user of the third mobile element MT3 of the telecommunication systems TKS1, TKS2, TKS3 shown in FIGS. 1 to 3, configured as a telecommunication handset TKHA, outputs an MP3 file, (which is stored for example on the personal computer PC), to the HIFI unit HA. The message sequence required for this operates according to FIGS. 9a to 9d between the second mobile element MT2, the personal computer PC with the integrated I/O mobile box card MBK connected to the second mobile element MT2 directly via the air interface LSS (point to point connection) or indirectly via the base station BS, the I/O mobile box MB connected to the personal computer PC via the air interface LSS and the HIFI unit HA connected to the I/O mobile box MB via the circuit connection CINCH, S/PDIF.

The units or components taken into account to represent the message sequence are (i) for the mobile element MT2 a user interface BSS, having a keypad TA and a display device AV configured as a display screen for example, an MT storage unit MT-S, a central control unit MT-P configured as an MT processor and a shared PC/MT air interface PC/MT-LSS operating between the mobile element MT2 and the personal computer PC with the integrated I/O mobile box card MBK, which are connected together in the manner shown, and (ii) for the personal computer PC with the integrated I/O mobile box card MBK the PC/MT air interface PC/MT-LSS shared with the mobile element MT2, a central control unit MT-P configured as an MT processor, a PC storage unit PC-S and a shared PC/MB air interface PC/MB-LSS operating between the personal computer PC with the integrated I/O mobile box card MBK and the I/O mobile box MB, which are connected together in the manner shown, (iii) for the I/O mobile box MB the PC/MB air interface PC/MB-LSS shared with the personal computer PC with the integrated I/O mobile box card MBK, a central control unit MB-P configured as an MB processor, an MB storage unit MB-S and a shared data interface DSS operating between the I/O mobile box MB and the television FA, which are connected together in the manner shown, and (iv) for the HIFI unit HA the data interface DSS shared with the I/O mobile box MB, a central control unit HA-P configured as an HA processor and an I/O converter E/A-W, which are connected together in the manner shown.

In an optional preliminary state VZ of the message sequence chart applicable to all units and components, both the personal computer PC and the HIFI unit HA can be in standby mode and be woken up and started up from this state by the mobile element MT2 according to the wake-up procedure described in FIG. 4. In a subsequent initial state AZ of the message sequence chart applicable to all units and components, the MP3 file stored in the personal computer PC is output on the HIFI unit HA. To this end a control command "MP3 list" STK is transmitted from the keypad TA of the user interface BSS by the MT processor MT-P. The MT processor MT-P transmits a request message "MP3 list" AFM via the PC/MT air interface PC/MT-LSS to the PC processor PC-P. As a result of this request message AFM the PC processor PC-P reads all the MP3 data from the PC storage unit PC-S. After this reading process the PC processor PC-P sends a response message AWM with an MP3 data list MP3-DL via the PC/MT air interface PC/MT-LSS to the MT processor MT-P. In the MT processor MT-P the MP3 data list MP3-DL is buffered in the MT storage unit MT-S and output to the display screen AV of the user interface BSS, where the MP3 data list MP3-DL is displayed. A control command "nth MP3 file from MP3 list to be transmitted to assigned I/O mobile box for output on HIFI unit" STK is then transmitted from the keypad TA of the user interface BSS to the MT processor MT-P. The MT processor MT-P then sends a prompt message "nth MP3 file from MP3 list to be transmitted to assigned I/O mobile box for output on HIFI unit" AFFN via the PC/MT air interface PC/MT-LSS to the PC processor PC-P. After the prompt message AFFM has been transmitted, the PC processor PC-P sends a prompt message "MP3 output on HIFI unit" AFM via the PC/MB air interface PC/MB-LSS to the MB processor MB-P, whereupon the MB processor MB-P transmits an information message "MP3 output on HIFI unit" INM via the data interface DSS to the HA processor HA-P. When this information message INM has been sent, the MB processor MB-P sends a response message "Ready for MP3 output" AWN via the PC/MB air interface PC/MB-LSS to the PC processor PC-P.

In state FZ1 of the message sequence chart applicable to the units and components "PC processor and PC storage unit", the data is transmitted in portions as a function of the quantity of data to be transmitted and the transmission rate of the air interface. To this end the PC processor PC-P reads a first portion of the nth MP3 data P1-n-MP3-D from the PC storage unit PC-S. After the reading process for this first portion of the nth MP3 data P1-n-MP3-D, the PC processor PC-P transmits the first portion of the nth MP3 data PI-n-MP3-D via the PC/MB air interface PC/MB-LSS to the MB processor MB-P, which transmits it to the MB storage unit MB-S for buffering and then forwards it to the HA processor HFA-P via the data interface DSS, to be output to the I/O converter E/A-W of the HIFI unit HA.

In a subsequent state FZ2 of the message sequence chart applicable to all units and components, the playing of the MP3 file on the HIFI unit HA is controlled by the user input of check commands on the user interface BSS of the mobile element. Such commands are for example, forward and back, pause, stop, continue, etc. To this end the MB processor MB-P sends a request message "Next MP3 data" AFM via the PC/MB air interface MC/MB-LSS to the PC processor PC-P. As a result of this request message ATM the PC processor PC-P reads a second portion of the nth MP3 data P2-n-MP3-D from the PC storage unit PC-S. After the reading process for this second portion of the nth MP3 data P2-n-MP3-D, the second portion of the nth MP3 data P2-n-MP3-D is transmitted from the PC processor PC-P via the PC/MB air interface PC/MB-LSS to the MB processor MB-P, which transfers it to the MB storage unit MB-S for buffering and then forwards it to the HA processor HA-P via the data interface DSS, to be output to the YO converter E/A-W of the HIFI unit HA.

In a subsequent state FZ3 of the message sequence chart applicable to all units and components, the playing of the MP3 file on the HIFI unit HA is controlled by the user input of check commands on the user interface BSS of the mobile element. Such commands are for example, forward and back, pause, stop, continue, etc. To this end the MB processor MB-P sends a request message "Next MP3 data" AFM via the PC/MB air interface MC/MB-LSS to the PC processor PC-P. As a result of this request message AFM the PC processor PC-P reads an mth portion of the nth MP3 data Pm-n-MP3-D from the PC storage unit PC-S. After the reading process for this mth portion of the nth MP3 data Pm-n-MP3-D, the mth portion of the nth MP3 data Pm-n-MP3-D is transmitted from the PC processor PC-P via the PC/MB air interface PC/MB-LSS to the MB processor MB-P, which transfers it to the NO storage unit MB-S for buffering and then forwards it to the HA processor HA-P via the data interface DSS, to be output to the VO converter E/A-W of the HIFI unit HA.

In a subsequent state FZ4 of the message sequence chart applicable to all units and components, the playing of the MP3 file on the HIFI unit HA is controlled by the user input of check commands on the user interface BSS of the mobile element. Such commands are for example, forward and back, pause, stop, continue, etc. To this end the MB processor MB-P sends a request message "Next MP3 data" AFM via the PC/MB air interface MC/MB-LSS to the PC processor PC-P. As a result of this request message AFM the PC processor PC-P transmits a response message "End of transmission" AWM via the PC/MB air interface PC/MB-LSS to the MB processor MB-P. The MB processor MB-P then sends an information message "MP3 output terminated" to the HA processor HA-P via the data interface DSS.

FIGS. 10a to 10c show a seventh message sequence chart according to a seventh smart home scenario, in which the user of the third mobile element MT3 of the telecommunication systems TKS1, TKS2, TKS3 shown in FIGS. 1 to 3 configured as a telecommunication handset TKHA is informed by the mobile element MT2 of the start of a television program and its interruption by advertising blocks. The message sequence required for this operates according to FIGS. 10a to 10c between the second mobile element MT2 and the set-top box STB connected to this directly via the air interface LSS (point to point connection) or indirectly via the base station BS, with the television FA connected thereto and the connection to the DVB-T/S/T network DVBN.

The units or components taken into account to represent the message sequence are (i) for the mobile element MT2 a user interface BSS, having an I/O converter E/A-W, a keypad TA and a display device AV configured as a display screen for example, an MT storage unit MT-S, a central control unit MT-P configured as an MT processor and a shared MT/STB air interface MT/STB-LSS operating between the mobile element MT2 and the set-top box STB, which are connected together in the manner shown, and (ii) for the set-top box STB the MT/STB air interface MT/STB-LSS shared with the mobile element MT2, a central control unit STB-P configured as an STB processor, an AS/DS interface AS/DS-SS with a connection to the television FA and a DVB interface DVB-SS with the connection to the DVB-T/S/T network DVBN, which are connected together in the manner shown.

In a first initial state AZ of the message sequence chart applicable to all units and components, the mobile element MT3 supplies a reminder of the start of a specific television program. To this end a control command "Television program on channel X on day Y" STK is transmitted from the keypad TA of the user interface BSS to the MT processor MT-P. To set up an internal communication connection, the MT processor MT-P transmits a set-up message "Internal communication connection" AUM via the MT/STB air interface MT/STB-LSS to the STB processor STB-P. The STB processor STB-P then sends a confirmation message BM via the MT/STB air interface MT/STB-LSS back to the MT processor MT-P. The MT processor MT-P then transmits a request message "Television program on channel X on day Y" AFM via the MT/STB air interface MT/STB-LSS to the STB processor STB-P. As a result of this incoming request message AFM a "Video text or Electronic Program Guide (EPG)" evaluation AW takes place in the STB processor STB-P, during which video text or EPG signal information VT/EPG-SI (Electronic Program Guide) received via the DVB interface DVB-SS from the DVB-T/S/C network DVBN is evaluated. After the end of this evaluation AW by the STB processor STB-P, said STB processor STB-P sends a response message AWM with program data PD via the MT/STB air interface MT/STB-LSS to the MT processor MT-P. The MT processor MT-P then outputs the received program data PD to the display screen AV of the user interface BSS, where it is displayed. A control command "Reminder of the start of TV program Z (e.g. favorite sports program)" STK is then sent from the keypad TA of the user interface BSS to the MT processor MT-P. The MT processor MT-P then transmits a request message "Reminder of start of TV program Z" AFM via the MT/STB air interface MT/STB-LSS to the STB processor STB-P. As a result of this received request message AFM, the STB processor STB-P together with the DVB interface DVB-SS monitors "Start of TV program Z" ÜW. After the start of monitoring ÜW, the STB processor STB-P sends a response message "Reminder request received" AWM via the MT/STB air interface MT/STB-LSS to the MT processor MT-P. As a result of this response message AWM, to cancel the internal communication connection that has been set up, the MT processor MT-P then transmits a cancellation message "Internal communication connection" ABM via the MT/STB air interface MT/STB-LSS to the STB processor STB-P, which the latter responds to in the reverse direction by the same route with a further confirmation message DM, as a result of which the connection is canceled.

After this, as a result of the monitoring ÜW, the STB processor STB-P establishes "Start of TV program" FST. To set up an internal communication connection, the STB processor STB-P then transmits a set-up message "Internal communication connection" AUM via the MT/STB air interface MT/STB-LSS to the STB processor STB-P. The MT processor MT-P then sends a confirmation message BM via the MT/STB air interface MT/STB-LSS back to the STB processor STB-P. As a result of this received confirmation message BM, a reminder message "Start of TV program Z" is transmitted from the STB processor STB-P via the MT/STB air interface MT/STB-LSS to the MT processor MT-P, whereupon the MT processor MT-P outputs a first display information item "Start of TV program Z as a text alert (e.g. favorite sports program is starting)" AI1 to the display screen AV of the user interface BSS and/or a second display information item "Alert tone/melody or audio signal for TV program Z (e.g. trailer for favorite sports program)" AI2 to the I/O converter E/A-W of the user interface BSS. The respective display information items AI1, AI2 are then output on the display screen AV and/or to the I/O converter E/A-W. A control command "Reminder message received" STK is then sent from the keypad TA of the user interface BSS to the MT processor MT-P. After receiving the control command STG, to cancel the internal communication connection that has been set up, the MT processor MT-P transmits a cancellation message "Internal communication connection" ABM via the MT/STB air interface MT/STB-LSS to the STB processor STB-P, to which the latter responds in the reverse direction by the same route with a further confirmation message, as a result of which the connection is canceled.

In a subsequent state FZ of the message sequence chart applicable to all units and components, the mobile element MT2 supplies a reminder of the continuation of the TV program Z after it has been interrupted by an advertising block, said reminder being output after the end of said advertising block. To this end a control command "Reminder of continuation of TV program Z" STK is transmitted from the keypad TA of the user interface BSS to the MT processor MT-P. To set up an internal communication connection, the MT processor MT-P transmits a set-up message "Internal communication connection" AUM via the MT/STB air interface MT/STB-LSS to the STB processor STB-P. The STB processor STB-P then sends a confirmation message BM via the MT/STB air interface MT/STB-LSS back to the MT processor MT-P. The MT processor MT-P then sends a request message "Reminder of continuation of TV program Z" AFM via the MT/STB air interface MT/STB-LSS to the STB processor STB-P. As a result of this received request message AFM, the STB processor STB-P together with the DVB interface DVB-SS monitors "End of advertising block" ÜW. After the start of monitoring ÜW, the STB processor STB-P sends a response message "Reminder request received" AWM via the MT/STB air interface MT/STB-LSS to the MT processor MT-P. As a result of this response message AWM, to cancel the internal communication connection that has been set up, the MT processor MT-P then transmits a cancellation message "Internal communication connection" ABM via the MT/STB air interface MT/STB-LSS to the STB processor STB-P, which the latter responds to in the reverse direction by the same route with a further confirmation message BM, as a result of which the connection is canceled.

After this, as a result of the monitoring ÜW, the STB processor STB-P establishes "End of advertising block" FST.

To set up an internal communication connection, the STB processor STB-P then transmits a set-up message "Internal communication connection" AUM via the MT/STB air interface MT/STB-LSS to the MT processor MT-P. The MT processor MT-P then sends a confirmation message via the MT/STB air interface MT/STB-LSS back to the STB processor STB-P. As a result of this received confirmation message BM, the STB processor STB-P transmits a reminder message "End of advertising block" EM via the MT/STB air interface MT/STB-LSS to the MT processor MT-P, whereupon the MT processor MT-P outputs a first display information item "Continuation of TV program Z as text alert (e.g. favorite sports program starting again)" AI1 to the display screen AV of the user interface BSS and/or a second display information item "Alert tone/melody or audio signal for TV program Z (voice of presenter of favorite sports program)" AI2 to the I/O converter E/A-W of the user interface BSS. The respective display information item AI1, AI2 is then output on the display screen AV and/or to the I/O converter E/A-W. A control command "Reminder message received" STK is then sent from the keypad TA of the user interface BSS to the MT processor MT-P. After receiving the control command STG, to cancel the internal communication connection that has been set up, the MT processor MT-P transmits a cancellation message "Internal communication connection" ABM via the MT/STB air interface MT/STB-LSS to the STB processor STB-P, to which the latter responds in the reverse direction by the same route with a further confirmation message, as a result of which the connection is canceled.

Figure 11A:
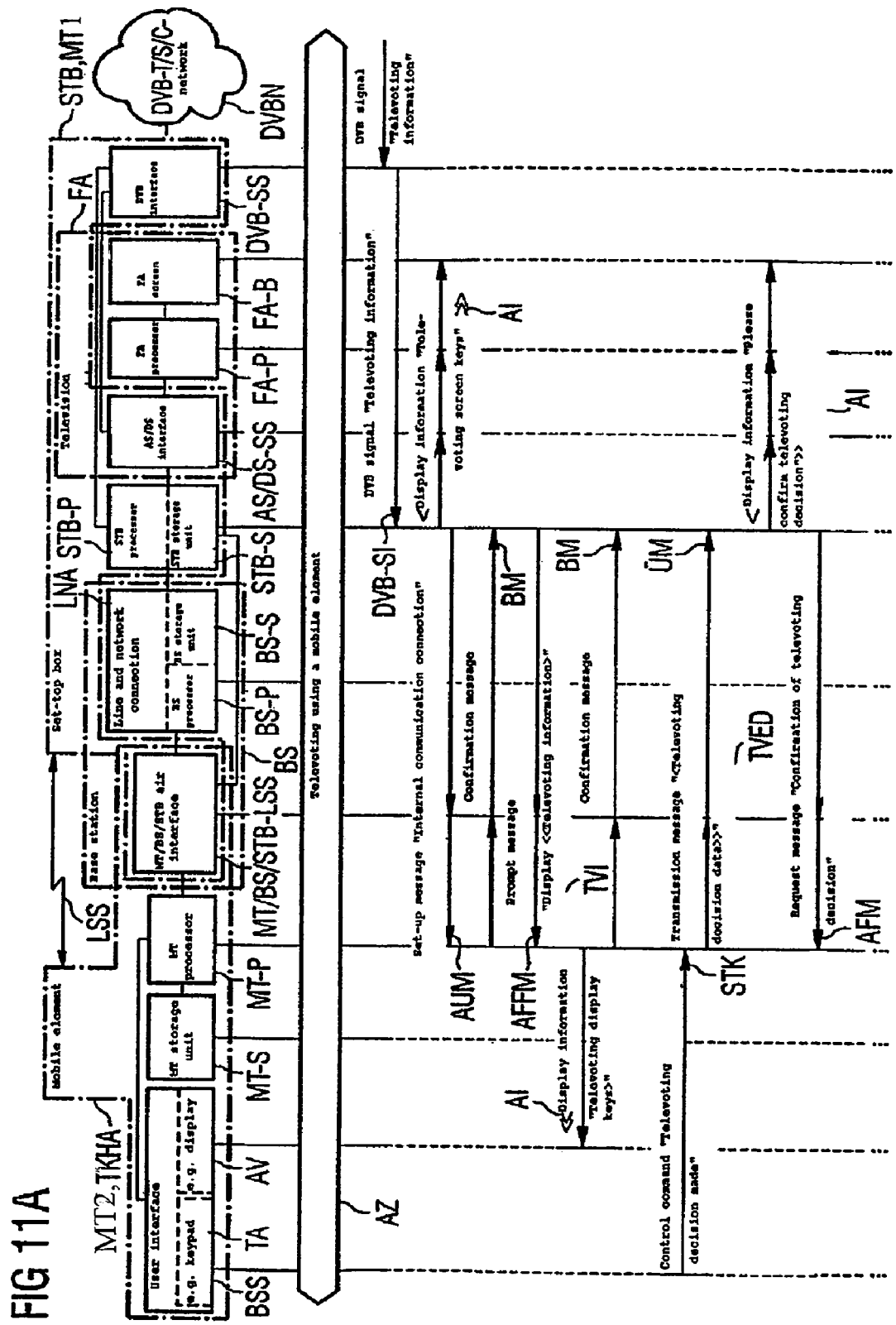
Figure 11B:
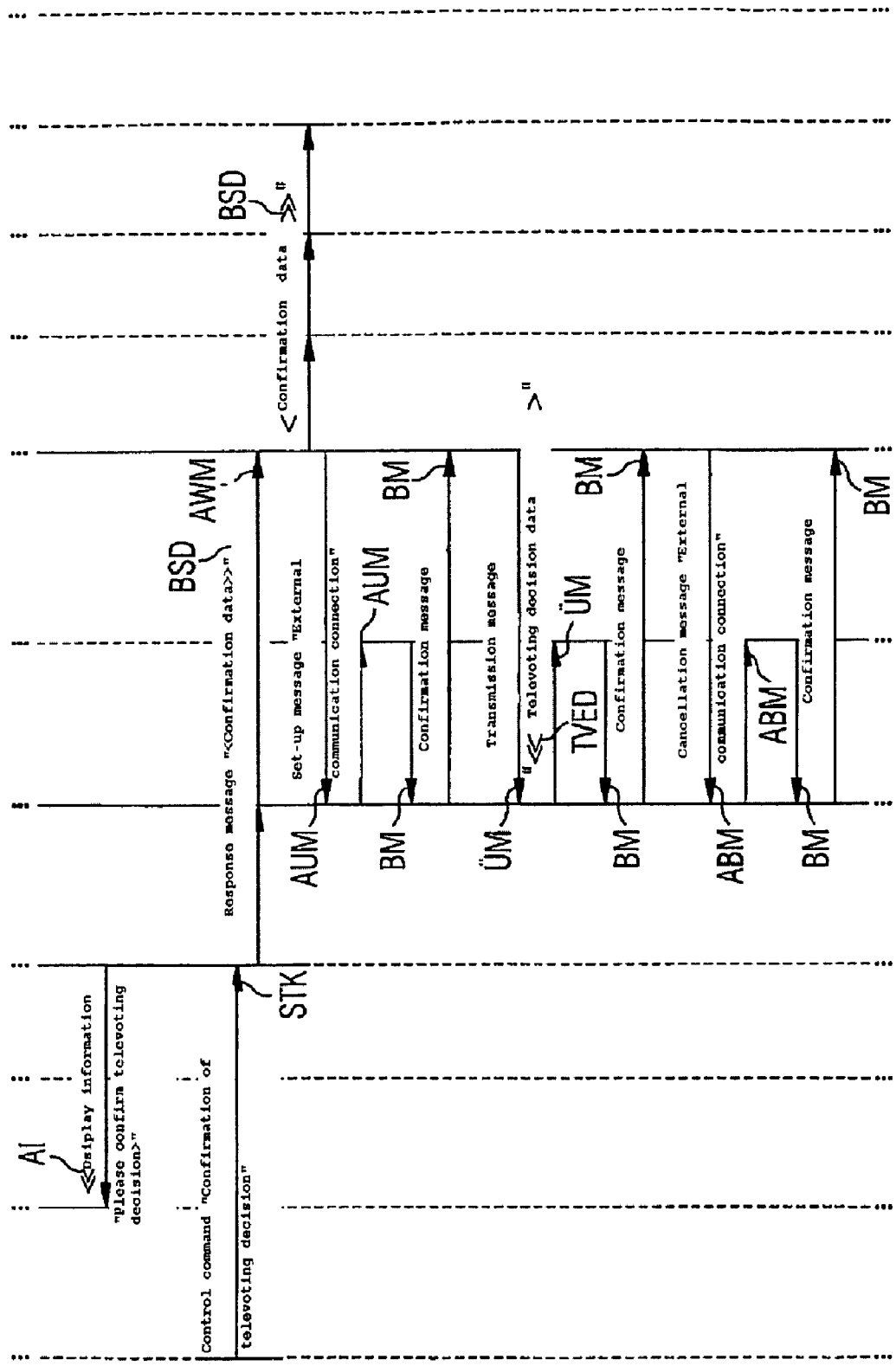

FIGS. 11a to 11c show an eighth message sequence chart according to an eighth smart home scenario, in which the user of the second mobile element MT2 of the telecommunication systems TKS1, TKS2, TKS3 shown in FIGS. 1 to 3 configured as a telecommunication handset TKHA uses said mobile element MT2 to take part in televoting. The message sequence required for this operates according to FIGS. 11a to 11c between the second mobile element MT2, the set-top box with the connection to the DVB-T/S/T network DVBN connected to the second mobile element MT2, the television FA connected to the set-top box and the base station BS connected to the second mobile element MT2 and the set-top box STB via the air interface LSS.

The units or components taken into account to represent the message sequence are (i) for the mobile element MT2 a user interface BSS, having a keypad TA and a display device AV configured as a display screen for example, an MT storage unit MT-S, a central control unit MT-P configured as an MT processor and a shared MT/BS/STB air interface MT/SB/STB-LSS operating between the mobile element MT2 as well as the set-top box STB and the base station BS, which are connected together in the manner shown, (ii) for the base station BS the MT/BS/STB air interface MT/SB/STB-LSS shared with the mobile element MT2 and the set-top box STB as well as a shared function block comprising a line and network connection LNA, a central control unit BS-P configured as a BS processor and a BS storage unit BS-S, which are connected together in the manner shown (iii) for the set-top box STB the MT/BS/STB air interface MT/BS/STB-LSS shared with the mobile element MT2 and the base station BS, a central control unit STB-P configured as an STB processor, a shared AS/DS interface AS/DS-SS operating between the set-top box STB and the television FA as well as a DVB interface DVB-SS with the connection to the DVB-T/S/T network DVBN, which are connected together in the manner shown, and (iv) for the television FA the AS/DS interface AS/DS-SS shared with the set-top box STB, a central control unit FA-P configured as an FA processor and an FA screen FA-B, which are connected together in the manner shown.

In an initial state AZ of the message sequence chart applicable to all units and components, the mobile element MT2 is used for televoting. To this end the STB processor STB-P receives a DVB signal "Televoting information" DVB-SI via the DVB interface DVB-SS from the DVB-T/S/C network DVBN. The STB processor STB-P then transmits a display information item "Televoting screen keys" via the AS/DS interface AS/DS-SS, the FA processor FA-P, to the FA screen FA-B and, to set up an internal communication connection, transmits a set-up message "Internal communication connection" AUM via the MT/BS/STB air interface MT/BS/STB-LSS to the MT processor MT-P. The MT processor MT-P then sends a confirmation message BM via the MT/BS/STB air interface MT/BS/STB-LSS back to the STB processor STB-P. As a result of this confirmation message BM the STB processor transmits a prompt message "Display televoting information" AFFM to the MT processor MT-P via the MT/BS/STB air interface MT/BS/STB-LSS together with a televoting information item TV 1. After receiving the prompt message AFFM together with the televoting information TV 1, the MT processor MT-P sends a display information item "Televoting display keys" to the display screen AV of the user interface BSS, where the televoting display keys are displayed. The MT processor MT-P also sends a confirmation message for the prompt message AFFM received via the MT/BS/STB air interface MT/BS/STB-LSS to the STB processor STB-P. A control command "Televoting decision made" STK is then transmitted from the keypad TA of the user interface BSS to the MT processor MT-P. The MT processor MT-P then transmits a transmission message "Televoting decision data" UM together with televoting decision data WED to the STB processor STB-P. As a result of this transmission message UM, the STB processor STB-P transmits a display information item "Please confirm televoting decision" AI via the AS/DS interface AS/DS-SS and the FA processor FA-P to the FA screen FA-B and a request message "Confirmation of televoting decision" AFM via the MT/BS/STB air interface MT/BS/STB-LSS to the MT processor MT-P. The MT processor MT-P then outputs a display information item "Please confirm televoting decision" to the display screen AV of the user interface BSS, where said information item is displayed. A control command "Confirmation of televoting decision" STK is then transmitted from the keypad TA of the user interface BSS to the MT processor MT-P. On receipt of the control command STK the MT processor MT-P sends a response message "Confirmation data" AWM together with confirmation data BSD via the MT/BS/STB air interface MT/BS/STB-LSS to the STB processor STB-P, which sends the received confirmation data BSD via the AS/DS interface AS/DS-SS and the FA processor FA-P to the FA screen FA-B. To set up an external communication connection, the STB processor STB-P then sends a set-up message "External communication connection" AUM via the MT/BS/STB air interface MT/BS/STB-LSS to the base station BS or the function block made up of the line and network connection LNA, the BS processor BS-P and the BS storage unit BS-S. The base station BS or this function block then sends a confirmation message BM via the MT/BS/STB air interface MT/BS/STB-LSS back to the STB processor STB-P. As a result of this confirmation message BM the STB processor STB-P transmits a transmission message "Televoting decision data" together with the televoting decision data WED via the MT/BS/STB air interface MT/BS/STB-LSS to the base station BS or the function block, whereupon said base station BS or function block sends a further confirmation message in the reverse direction by the same route to the STB processor STB-P. As a result of this confirmation message BM, to cancel the external communication connection that has been set up, the STB processor STB-P transmits a cancellation message "External communication connection" ABM via the MT/BS/STB air interface MT/BS/STB-LSS to the base station BS or the function block, which said base station BS or function block responds to in the reverse direction by the same route with a further confirmation message BM, as a result of which the connection is canceled. The STB processor STB-B then transmits an alert message "Televoting decision data transmitted" HWM via the MT/BS/STB air interface MT/BS/STB-LSS to the MT processor MT-P, whereupon said MT processor MT-P transmits a display information item "Televoting decision data was transmitted" to the display screen AV of the user interface BSS, where said information is displayed. After transmitting the alert message HWM, to cancel the internal communication connection that has been set up, the STB processor STB-P sends a cancellation message "Internal communication connection" ABM via the MT/BS/STB air interface MT/BS/STB-LSS to the MT processor MT-P, which the latter responds to in the reverse direction by the same route with a further confirmation message, as a result of which the connection is canceled.

It should be understood that the various changes and modifications to the presently preferred embodiments described herein will be apparent to those skilled in the art. For example, dynamic frequency selections may be used as a filter. Furthermore, the disclosed method may also be used for establishing connections to a broadcast channel. Such changes and modifications can be made without departing from the spirit and scope of the present disclosure and without diminishing its intended advantages. It is therefore intended that such changes and modifications be covered by the appended claims.

The invention claimed is:

1. A method for wireless communication and telecommunication in a smart home environment comprising:
    connecting a base station for conducting telephone calls and sending/receiving at least one of text, audio, video and control data to at least one of a circuit-switched network and packet-switched network with an EXTERNAL data source/data sink assigned to said network for at least one of text, audio, video and control data;
    assigning a first mobile element to the base station for at least one of conducting telephone calls and sending/receiving at least one of text, audio, video and control data via at least one air interface or via at least one air interface and a line interface;
        wherein the first mobile element sends/receives at least one of text, audio, video and control data; and
        wherein the first mobile element and the base station being assigned to a first INTERNAL data source/data sink to send the at least one of text, audio, video and control data transmitted from the INTERNAL data source/data sink and to receive at least one of text, audio, video and control data to be transmitted to the first INTERNAL data source/data sink;
    assigning a second mobile element and base station to a second INTERNAL data source/data link to send at least one of text, audio, video, and control data transmitted from the second INTERNAL data source link;
    wherein the second mobile element generates control commands and sends the commands via the air interface, with said control commands is configured to access at least one of text, audio, video and control data terminated in at least one of the base station, the first mobile element, the second mobile element, and the INTERNAL data source/sink;
    and if there is more than one second mobile element, the second mobile element is configured to conduct INTERNAL telephone calls or to send/receive internally at least one of text, audio, video and control data between the second mobile elements;
    wherein the data is being sent from at least one of the base station, the first mobile element, the second mobile element, and the INTERNAL data source/sink; and
    wherein the data is terminated, directly or indirectly to at least one of the first INTERNAL data source/data sink or second INTERNAL data source/data sink, the second mobile element, and the EXTERNAL data source/data sink to be output, released or transferred out.

2. The method according to claim 1, wherein check commands are generated and transmitted in a HF signal via the air interface, wherein the check commands also control the output, release and transfer out of the at least one of text, audio, video and control data.

3. The method according to claim 1, wherein the air interface comprises a shared interface for telephony and broadband transmission or a separate interface for telephony and broadband transmission respectively.

4. The method according to claim 3, wherein an interface is used as the air interface, wherein the interface is based on one of the standards selected from the group consisting of: DECT, WDCT, DECT and Bluetooth, WDCT and Bluetooth, DECT and IEEE 802.11a, DECT and IEEE 802.11b, DECT and IEEE 802.11g, WDCT and IEEE 802.11a, WDCT and IEEE 802.11b, WDCT and IEEE 802.11g, GSM and DECT, GSM and Bluetooth, GSM and IEEE 802.11a, GSM and IEEE 802.11b, GSM and IEEE 802.11g, 3GPPP and Bluetooth, 3GPP and IEEE 802.11a, 3GPP and IEEE 802.11b, and 3GPP and IEEE 802.11g.

5. The method according to claim 1, wherein text data comprises short messages according to the Short Message Service or video text information, audio data comprises telephone call information, music information according to the Multimedia Message Service, audio downloads from the internet, or MP3 files, video data comprises image information according to the Multimedia Message Service or video downloads from the internet, and control data comprises data for controlling, measuring, regulating, calibrating, diagnosing, and/or maintaining electrical appliances.

6. The method according to claim 1, wherein the second mobile element comprises a cordless telephone handset with keypad or voice control and display device including menu control and the base station comprises a cordless base station.

7. The method according to claim 1, wherein the second mobile element comprises a mobile telephone with a cordless interface, a mobile telephone with a Bluetooth interface, keypad, voice control, or display device including menu control and the base station comprises a cordless base station.

8. The method according to claim 1, wherein the first mobile element comprises a cordless I/O mobile box with an Ethernet interface or a USB interface.

9. The method according to claim 1, wherein the first mobile element comprises at least one of a cordless set-top box and/or a cordless I/O mobile box having an analog/digital interface, a SCART/S-VIDEO interface, a CINCH/S-PIDF interface, and an EIB/LON/LCN/KNX interface.

10. The method according to claim 1, wherein the first INTERNAL data source/data sink comprises the first mobile element coupled to a personal computer.

11. The method according to claim 1, wherein the first INTERNAL data source/data sink comprises the first mobile element integrated in a personal computer.

12. The method according to claim 1, wherein the second INTERNAL data source/data sink comprises the first mobile element coupled to a television, a HIFI unit, or an electrical appliance.

13. The method according to claim 1, wherein the second INTERNAL data source/data sink comprises the second mobile element integrated in a television, a HIFI unit, or an electrical.

14. The method according to claim 1, wherein the EXTERNAL data source/data sink comprises a multimedia message service center or a short message service center.

15. The method according to claim 1, wherein the first INTERNAL data source/data sink comprises the base station coupled to a personal computer and the second INTERNAL data source/data sink comprises the base station coupled to a television, a HIFI unit, or an electrical appliance.

16. The method according to claim 1, wherein the first INTERNAL data source/data sink comprises the base station as a network interface module integrated in a personal computer and the second INTERNAL data source/data sink comprises the base station integrated in a television, HIFI, or an electrical appliance.

17. The method according to claim 1, wherein the first INTERNAL data source/data sink comprises the first mobile element coupled to a personal computer or first mobile element is integrated in a personal computer, and wherein the control commands are used to wake up and start up the personal computer from standby mode.

18. The method according to claim 1, wherein the second INTERNAL data source/data sink comprises the first mobile element coupled to a television or an electrical appliance or wherein the second mobile element is integrated in a television, a HIFI unit, or an electrical appliance, and wherein the control commands are used to wake up and start up the television, HIFI unit, or electrical appliance from standby mode.

19. The method according to claim 1, wherein the first mobile element comprises at least one of a cordless set-top box, a cordless I/O mobile box having an analog/digital interface, a SCART/S-VIDEO interface, a CINCH/S-PIDF interface, an EIB/LON/LCN/KNX interface and wherein the second INTERNAL data source/data sink comprises the first mobile element coupled to a television, a HIFI unit, an electrical appliance, or the second mobile element is integrated in a television, a HIFI unit, or an electrical appliance, and wherein the control commands are used to implement televoting.

20. The method according to claim 1, wherein the first mobile element comprises at least one of a cordless set-top box, a cordless I/O mobile box having an analog/digital interface, a SCART/S-VIDEO interface, a CINCH/S-PIDF interface, and an EIB/LON/LCN/KNX interface, and wherein the second INTERNAL data sink/data source comprises the first mobile element coupled to a television, a HIFI unit, an electrical appliance, or the second mobile element is integrated in a television, a HIFI unit, or an electrical appliance, and wherein the control commands are used to display the start and continuation of a television program on the second mobile element.

21. A telecommunication system for wireless communication and telecommunication in a smart home environment comprising:
    a base station for conducting telephone calls and sending/receiving at least one of text, audio, video and control data, which can be connected to:
    at least one of a circuit-switched network and a packet-switched network with an EXTERNAL data source/data sink assigned to said network for at least one of text, audio, video and control data; and
    at least one mobile element for at least one of conducting telephone calls and sending/receiving at least one of text, audio, video and control data via at least one air interface or via at least one air interface and a line interface;
    wherein a first mobile element being configured to send/receive at least one of text, audio, video and control data, wherein the first mobile element and the base station being assigned respectively to an INTERNAL data source/data sink, to receive the at least one of text, audio, video and control data intended for the first INTERNAL data source/data sink and to send the at least one of text, audio, video and control data originating from the first INTERNAL data source/data sink;
    wherein a second mobile element is configured to conduct EXTERNAL telephone calls or to EXTERNAL send/receive at least one of text, audio, video and control data via the base station and, if there is more than one second mobile element, also to conduct INTERNAL telephone calls or to send/receive internally at least one of text, audio, video and control data between the second mobile elements;
    wherein the second mobile element comprises:
        a central control unit connected to the air interface to control the operation and function processes in the second mobile element,
        a storage unit assigned to the central control unit,
        means to connect to the central control unit for inputting at least one of text, audio, video and control data, and
        means for outputting at least one of text, audio, video and control data, which form a function unit, which is configured such that control commands are generated and transmitted via the air interface;
    wherein said control commands are configured to access at least one of text, audio, video and control data terminated in the base station, the first mobile element, the second mobile element, and the INTERNAL data source/sink; and
    wherein the data being sent from the at least one of the base station, the first mobile element, the second mobile element, and the INTERNAL data source/sink in which the data terminated, directly or indirectly to at least one of the INTERNAL data source/data sink or a further INTERNAL data source/data sink, the second mobile element or a further second mobile element, and the EXTERNAL data source/data sink to be output, released or transferred out.

22. The telecommunication system according to claim 21, wherein in the second mobile element the central control unit with the assigned storage unit connected to the air interface and the input means and output means connected to the central control unit are configured such that check commands are generated and transmitted in the HF signal via the air interface, with the check commands also being able to control the output, release and transfer out of the text, audio, video and/or control data.

23. The telecommunication system according to claim 21, wherein the air interface includes or is a shared interface for telephony and broadband transmission or a separate interface for telephony and broadband transmission respectively.

24. The telecommunication system according to claim 23, wherein the air interface is an interface based on a standard selected from the group consisting of: DECT, WDCT, DECT and Bluetooth, WDCT and Bluetooth, DECT and IEEE 802.11a, DECT and IEEE 802.11b, DECT and IEEE 802.11g, WDCT and IEEE 802.11a, WDCT and IEEE 802.11b, WDCT and IEEE 802.11g, GSM and DECT, GSM and Bluetooth, GSM and IEEE 802.11a, GSM and IEEE 802.11b, GSM and IEEE 802.11g, 3GPPP and Bluetooth, 3 GPP and IEEE 802.11a, 3 GPP and IEEE 802.11b, and 3GPP and IEEE 802.11g.

25. The telecommunication system according to claim 21, wherein the text data includes short messages according to the Short Message Service or video text information, the audio data includes telephone call information, music information according to the Multimedia Message Service or audio downloads from the internet, in particular MP3 files, the video data includes image information according to the Multimedia Message Service or video downloads from the internet and/or the control data includes data for controlling, measuring, regulating, calibrating, diagnosing and/or maintaining electrical appliances, in particular in the domestic field.

26. The telecommunication system according to claim 21, wherein the second mobile element comprises a cordless user-friendly telephone handset with keypad or voice control and display device including menu control and the base station is configured as comprises a cordless base station.

27. The telecommunication system according to claim 21, wherein the second mobile element comprises a mobile telephone with a cordless interface, in particular a Bluetooth interface, keypad or voice control and display device-including menu control and the base station comprises a cordless base station.

28. The telecommunication system according to claim 21, wherein the first mobile element comprises a cordless I/O mobile box with an Ethernet interface or a USB interface.

29. The telecommunication system according to claim 21, wherein the first mobile element comprises at least one of a cordless set-top box, a cordless I/O mobile box having an analog/digital interface, a SCART/S-VIDEO interface, a CINCH/S-PIDF interface, an EIB/LON/LCN/KNX interface.

30. The telecommunication system according to claim 21, wherein the first INTERNAL data source/data sink comprises the first mobile element coupled to a personal computer.

31. The telecommunication system according to claim 21, wherein the first INTERNAL data source/data sink comprises the first mobile element integrated in a personal computer.

32. The telecommunication system according to claim 21, wherein the second INTERNAL data source/data sink comprises the first mobile element coupled to a television or an electrical appliance.

33. The telecommunication system according to claim 21, wherein the second INTERNAL data source/data sink comprises the first mobile element integrated in a television, a HIFI unit, or an electrical appliance.

34. The telecommunication system according to claim 21, wherein the EXTERNAL data source/data sink comprises a multimedia message service center or a short message service center.

35. The telecommunication system according to claim 21, wherein the first INTERNAL data source/data sink comprises the base station coupled to a personal computer, and wherein the second INTERNAL data source/data sink comprises the base station coupled to a television, a HIFI unit, or an electrical appliance.

36. The telecommunication system according to claim 21, wherein the base station comprises a network interface module, wherein the first INTERNAL data source/data sink comprises the base station integrated in a personal computer, and wherein the second INTERNAL data source/data sink comprises the base station integrated in a television, HIFI, or an electrical appliance.

37. The telecommunication system according to claim 21, wherein the first INTERNAL data source/data sink comprises the first mobile element coupled to a personal computer or first mobile element is integrated in a personal computer, and wherein the control commands are supplied such that the personal computer is woken up and started up from standby mode.

38. The telecommunication system according to claim 21, wherein the second INTERNAL data source/data sink comprises first mobile element coupled to a television or an electrical appliance or the first mobile element is integrated in a television, a HIFI unit, or an electrical appliance, and wherein the control commands are supplied such that the television, the HIFI unit, or electrical appliance is woken up and started up respectively from standby mode.

39. The telecommunication system according to claim 21, wherein the first mobile element comprises at least one of a cordless set-top box, a cordless I/O mobile box having an analog/digital interface, a SCART/S-VIDEO interface, a CINCH/S-PIDF interface, an EIB/LON/LCN/KNX interface respectively; and wherein the second INTERNAL data source/data sink comprises the first mobile element coupled to a television or an electrical appliance or the first mobile element is integrated in a television, a HIFI unit, or an electrical appliance; and wherein the control commands are supplied such that televoting is implemented.

40. The telecommunication system according to claim 21, wherein the first mobile element comprises at least one of a cordless set-top box, a cordless I/O mobile box having an analog/digital interface, a SCART/S-VIDEO interface, a CINCH/S-PIDF interface, an EIB/LON/LCN/KNX interface; and wherein the second INTERNAL data source/data sink comprises the first mobile element coupled to a television or an electrical or the first mobile element is integrated in a television, a HIFI unit, or an electrical appliance; and wherein the control commands are supplied such that the start and continuation of a television program are displayed on the second mobile element.

* * * * *